(12) United States Patent
Laskowski

(10) Patent No.: US 6,205,754 B1
(45) Date of Patent: Mar. 27, 2001

(54) APPARATUS AND METHOD FOR SUPPORTING A CUTTING BLADE ON A MOWER

(76) Inventor: Jeffrey J. Laskowski, 7258 N. State Rd. 39, Lizton, IN (US) 46149

( * ) Notice: Subject to any disclaimer, the term of this patent is extended or adjusted under 35 U.S.C. 154(b) by 0 days.

(21) Appl. No.: 09/186,568

(22) Filed: Nov. 5, 1998

Related U.S. Application Data

(63) Continuation-in-part of application No. 08/899,528, filed on Jul. 24, 1997, now Pat. No. 6,000,202.

(51) Int. Cl.⁷ .......................... A01D 34/24; A01D 34/42; A01D 34/63
(52) U.S. Cl. .............................................. 56/15.1; 56/17.1
(58) Field of Search .................... 56/15.7, 15.8, 56/15.9, 17.1, 14.9, 208, DIG. 3, DIG. 10, DIG. 14, 15.1

(56) References Cited

U.S. PATENT DOCUMENTS

| | | | |
|---|---|---|---|
| 4,120,136 | * 10/1978 | Rose | 56/17.1 |
| 4,577,455 | * 3/1986 | Amano et al. | 56/17.1 |
| 4,858,417 | * 8/1989 | Priefert et al. | 56/6 |
| 4,930,298 | 6/1990 | Zenner . | |
| 5,249,411 | * 10/1993 | Hake | 56/11.6 |
| 5,355,664 | 10/1994 | Zenner . | |
| 5,381,648 | * 1/1995 | Seegert et al. | 56/17.1 |
| 5,528,889 | * 6/1996 | Kure et al. | 56/15.6 |
| 5,771,669 | * 6/1998 | Langworthy et al. | 56/6 |
| 5,813,202 | * 9/1998 | Goman et al. | 56/15.2 |
| 5,816,033 | * 10/1998 | Busboom et al. | 56/10.8 |
| 5,816,035 | * 10/1998 | Schick | 56/15.2 |
| 5,956,932 | * 9/1999 | Schmidt | 56/15.6 |

\* cited by examiner

*Primary Examiner*—Robert E. Pezzuto
*Assistant Examiner*—Arpad Fabian Kovacs
(74) *Attorney, Agent, or Firm*—Woodard, Emhardt, Naughton, Moriarty & McNett

(57) ABSTRACT

A mowing apparatus with multiple articulating cutting decks includes a support for the cutting blades which is attached at a first side to the mower to pivot about a horizontal axis, and is carried by a rocker arm at an opposing second side. The rocker arm has ground support wheels at its opposing ends and is coupled to the second side of the support by linkage that is adjustable to vary the position of the support member relative to the rocker arm and to vary the height of the cutting blade from ground.

18 Claims, 19 Drawing Sheets

APPARATUS AND METHOD FOR SUPPORTING A CUTTING BLADE ON A MOWER

CROSS REFERENCE TO RELATED APPLICATIONS

The present application is a continuation-in-part of pending U.S. patent application Ser. No. 08/899,528 filed Jul. 24, 1997 now U.S. Pat. No. 6,000,202.

FIELD OF THE INVENTION

The present invention relates to improvements in the field of lawn mowers with multiple articulating cutting blades, and particularly to a manner of support for the cutting blades to optimize the position of the blades for cutting relative to the ground.

DESCRIPTION OF THE PRIOR ART

In many applications it is desirable to have a mower which can cut a relatively wide path of grass in order to handle larger lawns and fields. The cost and time of mowing can be substantially reduced by using a mower with a wide cutting path. However, the wider the cutting path is, the more likely it is that a particular path of the mower will encounter irregularities in the terrain. The cutting blades of the mower must be able to articulate over these irregularities, or they will scalp the high areas and miss grass in the low areas.

The articulation of multiple cutting blades poses several issues for a mowing apparatus. The relative movement of the blades should be controlled to provide an even cutting of the grass. At the same time, the manner of articulation requires means for providing movement of the blades while also powering the blades in the cutting action. There are numerous proposals for solutions to problems associated with this articulation, including what kind of articulation to permit, how to implement that articulation, and how to maintain delivery of power to the cutting blades during articulation.

It is also important to optimize the position of the blades for cutting. For example, with a relatively large mowing apparatus the blades may not be maintained at an appropriate height relative the grass. As the mower encounters hills or valleys, the height of the blades must ride over the surface to minimize or avoid having grass which is cut too long or too short. If a single point of support, e.g., a single wheel, is used, the placement of the support may improperly ride over the ground. On the other hand, when multiple support points are used, the grass will still not be appropriately cut if the support wheels do not maintain contact with the ground. There has therefore remained a continuing need for a wheel support system that provides proper positioning of the blades for cutting, even when hills or valleys are encountered.

A further consequence of multiple decks having multiple ground support wheels is the difficulty associated with changing the cutting height. This becomes more important as the number of gauge wheels increases to maintain cutting accuracy. Present systems having multiple decks require each wheel assembly to be adjusted, usually by removing or shifting one or more spacers on the wheel support structure. This can be a time consuming and laborious process. What is needed is a manner of adjusting the cutting height of all or many of the gauge wheels at one time, from one location by the operator of the mower, and preferrably without having to leave the operating seat.

SUMMARY OF THE INVENTION

Briefly describing one aspect of the present invention, there is provided an apparatus for supporting a cutting blade on a mower which facilitates adjustment of the height of the cutting blade relative to the grass to be mowed. The apparatus includes a rotatable shaft secured to the cutting blade; a support member having first and second generally opposing sides and holding the shaft and blade for rotation between the opposing sides, the support member being mounted at the first side to the mower to pivot about a horizontal axis; a rocker arm having first and second ends; a ground support wheel rotatably mounted at each of the first and second ends of the rocker arm; and, linkage coupling the second end of the support member to the rocker arm. The linkage is adjustable to vary the position of the support member relative to the rocker arm to vary the height of the cutting blade from ground. The linkage may be adjustable either directly at each rocker arm or may remotely adjustable from the driver's seat of the mowing vehicle.

It is an object of the present invention to provide an improved apparatus for supporting a cutting blade on a mower.

It is another object of the present invention to provide an apparatus for supporting a cutting blade on a mower that improves the position of the cutting blade relative to the grass to be cut.

A further object of the present invention is to provide a cutting blade support which is readily adjustable to different heights.

It is another object of the present invention to provide an improved mower including a support for the cutting blades having the foregoing features and advantages. Further advantages of the present invention will be apparent from the description of the preferred embodiment, which follows.

DESCRIPTION OF THE PREFERRED EMBODIMENT

Figure 1:
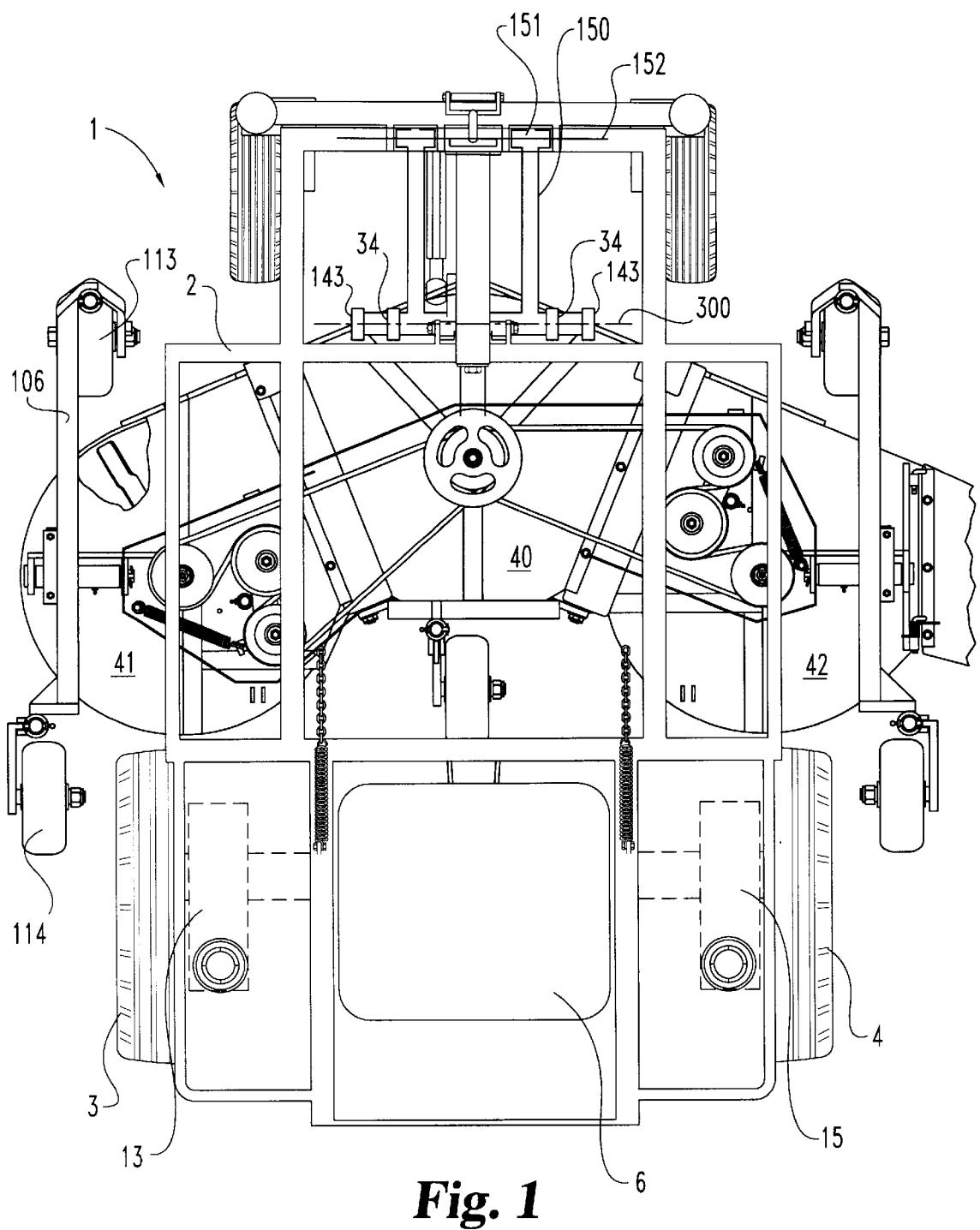
FIG. 1 is a top, plan view of portions of a mowing vehicle incorporating an apparatus for supporting a cutting blade on a mowing vehicle in accordance with one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations or modifications in the illustrated device, and any further applications of the principles of the invention as illustrated therein are contemplated as would normally occur to one skilled in the art to which the invention relates.

The present invention is related to a mowing apparatus, which includes articulating cutting decks supporting cutting blades that smoothly and accurately follow the contour of the terrain being cut. As used herein, the term cutting deck refers generally to the mounting structure to which the cutting blades are rotatably attached. Thus, reference to the articulation of the cutting decks is similarly a reference to the articulation of the supported cutting blades. The preferred embodiment is shown in respect to three cutting decks, one in the center and one on either side. However, it will be appreciated that the principles of the present invention apply equally well to any assembly of cutting decks secured together for articulation.

The present invention is also useful with any apparatus that is used for mowing. In the preferred embodiment, the articulating cutting blades are shown as being incorporated into a self-contained vehicle that would also include an engine, wheels, controls, etc. The invention could alternatively form a part of an assembly that is attached to a separate vehicle, which pushes or pulls the mowing apparatus.

Articulation of the cutting decks and blades requires that the decks be mounted to permit relative movement in two respects. First, the decks are mounted directly or indirectly to a supporting framework and are permitted to move relative thereto. Second, a given deck is attached to at least one adjacent deck in a manner to permit one deck to pivot or otherwise move relative to the other deck. In a preferred embodiment and for purposes of description herein, there is provided an assembly of three decks, namely a center deck and two side decks.

To provide the desired positioning of a deck relative the ground, the decks each ride at least partially on wheels, which roll over the ground. Preferably each deck is permitted to be supported relative the ground by three support points. For example, a side deck is pivotally hinged to the center deck at two coaxial locations. The side deck is also supported along the ground at its outer edge. The two hinge locations plus the outer support constitute three-point support for the side deck. Since the three points define a plane, the deck is properly supported on the ground and is free to closely follow the contour of the ground over which it moves.

Similarly, the center deck and supported cutting blade are positioned for three point support relative the ground. The front of the center deck is supported for pivoting along a horizontal hinge line, and the rear of the deck is supported at a single point by a wheel. The two points required to establish the hinge line and the single point of rear support constitute three-point support for the center deck.

The cutting blades are driven by drive belts and pulleys. One belt provides power from the engine to the center deck. When three decks are included, a separate belt provides power from the center deck to each of the side decks. As the center deck articulates relative to the engine, and the side decks articulate relative to the center deck, the distance between belt pulleys changes. Proper tension is maintained in the belts by changing the effective distance over which the belts must travel between the pulleys. In particular, this is accomplished by routing each belt around a pair of idler pulleys that are rotatably attached to a pulley arm. The pulley arm is attached pivotally to the mower, and thereby the length of drive belt in engagement with the idlers is changed as required.

The belt is wrapped in an "S" shape around the idlers. As the drive pulleys move apart during articulation, the "S" shape unwinds as the idler pulleys rotate in one direction about the pivot point of the pulley arm. As the drive pulleys move closer together, the "S" shape winds further as the idler pulleys rotate in the other direction about the pivot point of the pulley arm.

The pulley arm is biased in a direction which increases tension on the associated drive belt. The pivot arm may be biased in this manner in various ways well known in the art. For example, biasing is accomplished by attaching a spring at one end to the pulley arm, and at the other end to one of the cutting decks. The spring pulls on the pulley arm in the direction of increasing belt tension. Various other means for biasing the pulley arm in the required direction may be used.

Figure 2:
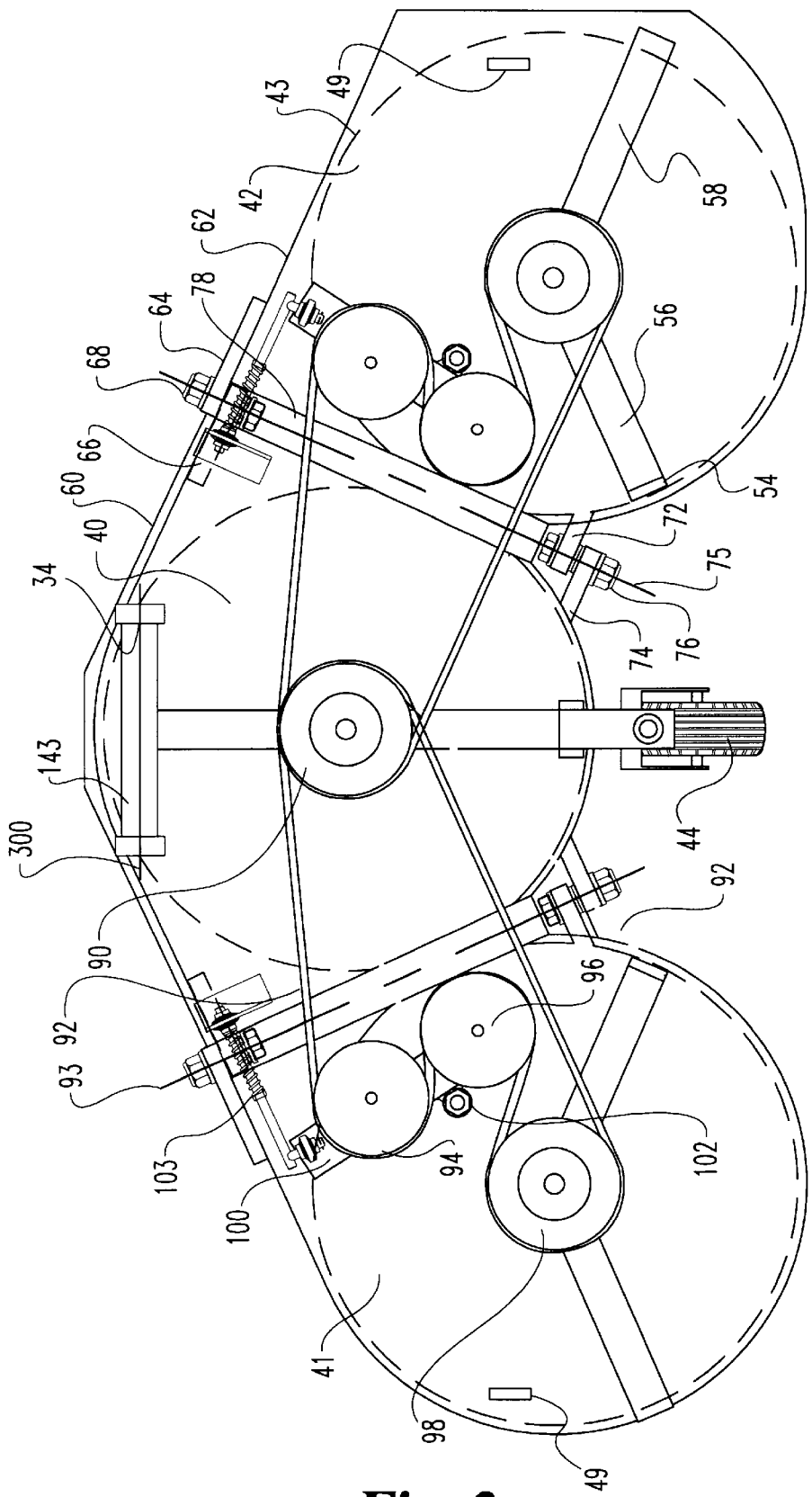
FIG. 2 is a top, plan view of cutting decks of the mowing vehicle of FIG. 1 and showing a configuration using a compression spring rather than an extension spring to tension the drive belts.
Figure 3:
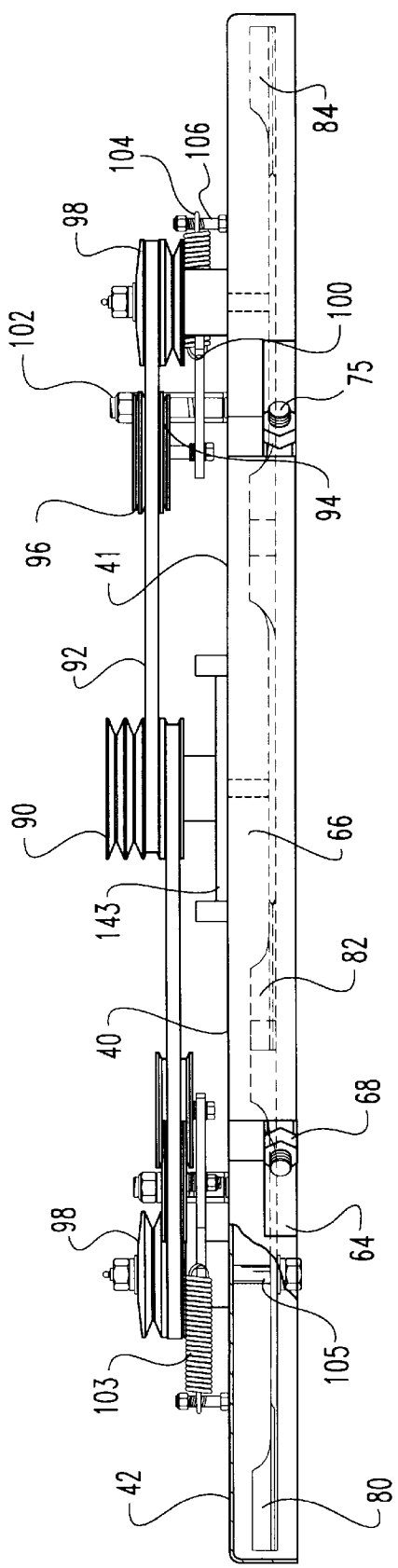
FIG. 3 is a front, elevational view of the cutting decks shown in FIG. 2.
Figure 4:
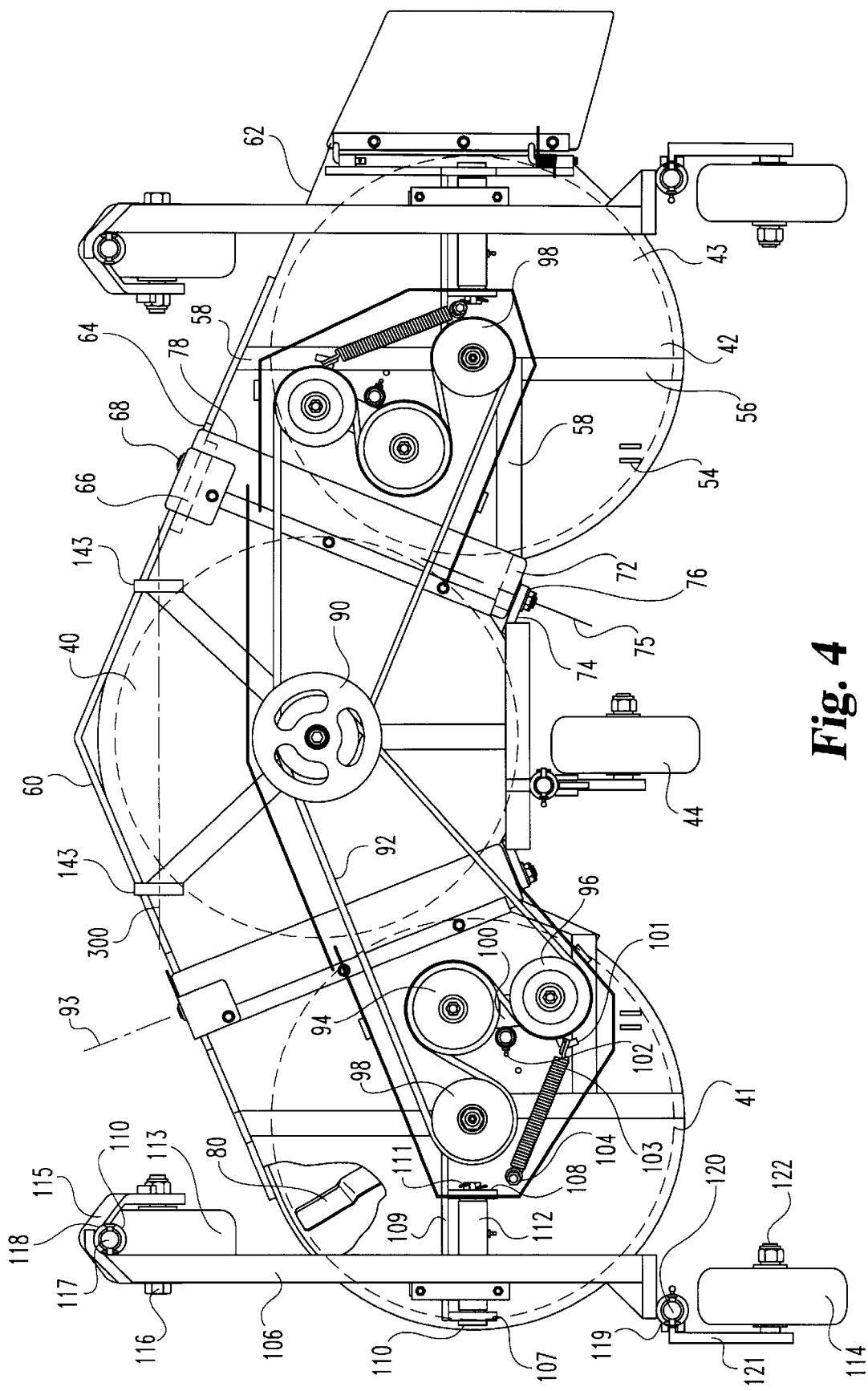
FIG. 4 is a top, plan view of a portion of the mowing vehicle of FIG. 1, and showing a configuration using an extension spring rather than a compression spring to tension the drive belts.

Referring now to FIGS. 1–5, there is shown an apparatus 1 for supporting a cutting blade on a mowing vehicle in accordance with one embodiment of the present invention. The cutting decks shown in FIGS. 2 and 4 are slight variants of each other, the primary difference being in the manner by which the drive belts to the outer decks are tensioned. The apparatus 10 for supporting a cutting blade on a mowing vehicle is otherwise identical in its connection and operation with the decks of FIGS. 2 and 4. The following discussion will be directed to the decks of both FIGS. 2 and 4 with minor differences pointed out for clarity. A mowing vehicle 1 includes a main frame 2 which extends side to side and front to rear of the vehicle and forms a means of support for many of the components of the vehicle. Vehicle 1 includes driving wheels 3 and 4, which receive power from hydraulic drive units 13 and 15, respectively. These hydraulic drive units, as well as the cutting blade drive system to be described later, are powered by engine 6, which is supported by main frame 2. For purposes of clarity and since they form no part of the present invention, the seat, various covers, and control components are not shown in FIG. 1.

Attached on either side of center deck 40 are side decks 41 and 42. Attachment of side deck 42 to center deck 40 and vertical support of side deck 42 will be described in detail. The attachment and support scheme of side deck 41 to center deck 40 is a mirror image of that for side deck 42 and therefore is not separately described.

Side deck 42 incorporates stiffeners 56 and 58 (FIG. 4) to reduce bending of the side deck. An attachment 54 can be used to attach a spring between the deck and the frame for load transfer to main frame 2. This load transfer helps reduce the vertical load of center deck rear wheel 44, and thus reduce damage to the grass from the footprint of the wheel.

Center deck support 143 mounts center deck 40 to frame 2. The support 143 includes a pair of forwardly extending arms 150 which terminate in sleeves 151 received upon shafts mounted to the frame 2, thereby providing for pivoting of the center deck support about the horizontal rotational axis 152. The center deck is further supported by pivotal attachments 34 of center deck support 143 (FIGS. 1 and 2). These pivotal attachments define rotational axis 300 for center deck 40. Center deck 40 is supported vertically at the rear by wheel 44. Alternate attachments of center deck 40 are contemplated as would occur to one skilled in the art.

In FIGS. 2 and 4 there are shown the three cutting decks of the present embodiment, and in particular the pivoting attachment of the side decks to the center deck. Front side hinge plate 64 is attached rigidly to side housing 62 of side deck 42. Front center hinge plate 66 is attached to the inside of center housing 60 of center deck 40, as shown by the dashed lines in FIGS. 2 and 4. Hinge plates 64 and 66 are rotatably connected by pivot 68. Side deck 42 is also rotatably attached to center deck 40 at the rear of both decks. Rear side hinge plate 72 is attached to side housing 62, and rear center hinge plate 74 is attached to center housing 60. Hinge plates 74 and 72 are rotatably coupled by pivot 76. Pivots 68 and 76 create an axis of rotation 75 of the side deck 42 relative center deck 40. Cover plate 78 covers the area between center housing 60 and side housing 62 that would otherwise be exposed during deck articulation.

Articulation of the cutting blades is accomplished without adversely affecting the cut accomplished by the blades. The cutting circle defined by rotation of the cutting blades is shown, for example, at 43. It will be apparent that the blades are positioned so that there is significant overlap of cutting as the mower is moved forward. There is also sufficient overlap of cutting to avoid gaps in the cutting when the mower is turned in either direction. In addition, articulation of the cutting blades optimizes the cutting profile even for uneven terrain. In particular, as shown in FIG. 3, the pivoting axis 75, for movement of the side deck relative the center deck, is located vertically in the plane of cutting by the blades 80 and 82. This provides a distinct advantage when the decks articulate. The pivoting of the connected decks at the blade level avoids the possibility of the blades moving to or from each other.

In FIGS. 2–4 there is shown the manner in which the side cutting blades of the present invention are driven. Center drive pulley 90 is driven by a drive belt (not shown), which is driven by engine 6. However, it is also possible for power to be transmitted to pulley 90 in another manner. For example, power could be provided to pulley 90 hydraulically, by a gear linkage, or in other ways. The manner of driving the center pulley does not impact on the mode of operation of the side pulley drive. Center pulley 90 is coupled with and drives side drive pulley 98 by means of side drive belt 92. Side drive belt 92 engages idler pulleys 94 and 96, and also side drive pulley 98. Side drive pulley 98 is attached rotatably to a shaft that drives cutting blade 84, as shown in FIG. 3.

As side deck 41 pivots about axis 93, the distance from side drive pulley 98 to center drive pulley 90 changes. Since drive belt 92 is of a constant length, the drive path of belt 92 must change to accommodate the change in distance between drive pulleys. The change in distance between drive pulleys 98 and 90 is accommodated by a complementary change in the path of the drive belt that engages idler pulleys 94 and 96 by pivoting idler pulleys 94 and 96 to maintain necessary belt tension.

The idler pulleys 94 and 96 are rotatably mounted onto a pulley arm 100. Pulley arm 100 is attached to side deck 41 by pivot 102 and is thereby rotatable about a vertical axis extending generally normal to the plane of the drive belt. Pivot 102 is preferably located between the rotational axes of pulleys 94 and 96. Tension spring 103 connects to pulley arm 100 at attachment 101, and to deck 41 at attachment 104. Spring 103 applies a force on pulley arm 100 to bias the arm in the direction to increase tension on the belt. In FIG. 4, tension spring 103 is in tension between deck 41 and arm 100 to rotate the pulley arm in the clockwise direction, and in FIG. 2, tension spring 103 is in compression between the arm and the deck to keep belt 92 in tension.

When side deck 41 articulates relative to center deck 40 in the upward direction, the distance from side drive pulley 98 to center drive pulley 90 will decrease since the decks pivot relative one another at a location below the drive belt. In this instance, spring 103 will rotate pulley arm 100 about pivot point 102. Since pivot 102 is located between pulleys 94 and 96, clockwise rotation (FIG. 4) of pulley arm 100 results in a change in the path of drive belt 92 that wraps around the idler pulleys. The result is that the slack which would otherwise occur in the belt is taken up by the idler pulleys.

Conversely, if the side deck pivots in a downward direction relative the center deck, the distance between side drive pulley 98 and center drive pulley 90 increases. In this instance, pulley arm 100 will rotate against the force of the spring 103 in the counterclockwise direction. This will alter the travel path for the drive belt between the pulleys 90 and 98. At the same time, the continuing spring force applied to the pulley arm 100 will maintain the desired tension on the side drive belt.

Side drive belt 92 engages idler pulleys 94 and 96 in an "S" shape. As seen in FIG. 4, side drive belt 92 wraps around one side of idler pulley 94, and then crosses over and wraps around the other side of idler pulley 96. Because of this crossover between the idler pulleys 94 and 96, movement of side drive belt 92 will cause the idler pulleys to rotate in opposite directions. The belt crossover and opposite rotation of the idler pulleys shown as the preferred embodiment is not required, however. For example, it is also possible to move the assembly of pivot, pulley arm, pulleys, and spring outboard of drive pulley 98. Then, by also moving pivot 102 to the opposite side of idler pulley 94, belt tension would also be maintained during pivoting of the side deck.

The idler pulleys and pulley arm assembly are shown mounted to the side deck. However, it is clear that the assembly could alternatively be mounted on the center deck. More generally, the pulley arm assembly could be mounted to either the driving or driven deck, or even to the mower at a location separate from the decks.

Although the preferred embodiment is shown using spring 103 in tension, it would also be possible to accomplish the biasing of pulley arm 100 with other conventional means. Alternate means include, for example, a compression spring or a torsional spring, in a manner known to those of ordinary skill in the art. FIG. 2 illustrates the use of a compression spring rather than an extension spring to accomplish the biasing of pulley arm 100.

Referring to FIGS. 1–5, the present invention provides a particularly advantageous system for mounting the cutting blades to the mower. Decks 41 and 42 constitute supports attached to the mower. Blade 80 is secured to shaft 105 which is rotatably mounted to deck 42 and coupled to pulley 98 in conventional fashion, and blade 84 is likewise rotatably mounted to deck 41 and coupled to its pulley 98. As previously described, decks 41 and 42 pivot relative to deck 40 about horizontal axes 93 and 75, respectively. A rocker arm 106 is rotatably mounted to deck 41 and serves to support the outer portion of the deck upon the ground. Ears 107 and 108 are attached to the deck and a stiffener 109 is similarly attached to the deck and extends between the ears. A bolt 110 is received through holes in the ears 107 and 108, and is retained by pin 111. Collar 112 is received over bolt 110 and the rocker arm is secured to the collar 112. Rocker arm 106 is thereby mounted to the deck to be rotatable about the axis of bolt 110.

Rocker arm 106 carries a pair of wheels 113 and 114. A yoke 115 includes an axle 116 upon which the wheel 113 is rotatably received. Yoke 115 is attached to a vertical shaft 117 which is rotatably received within a sleeve 118 secured to rocker arm 106. The shaft 117 is rotatable about its axis, thereby permitting wheel 113 to pivot freely at the front of the rocker arm. At the rear of rocker arm 106 there is secured a second sleeve 119 in which is rotatably received a vertically extending shaft 120. Secured to shaft 120 is a flange 121 which carries an axle 122 upon which wheel 114 is rotatably received.

Means are provided for adjusting the vertical position of the wheels relative to the mower. As shown in particular in FIG. 5, a series of spacers are used to adjust the relative position of the wheels by varying the position of the shafts in comparison to the respective sleeves. For example, the front wheel 113 is shown with several spacers 123 received on shaft 117 below sleeve 118, and several other spacers similarly received on shaft 117, but above sleeve 118. The spacers are retained upon the shaft by means of a quick-release pin 124. A similar arrangement is used for the mounting of the rear wheel 114. It will be readily appreciated that the vertical position of the shaft, and therefore of the wheel, relative to the mower can be easily adjusted by varying the location of the spacers above and below the sleeve.

It has been discovered that the use of a rocker arm assembly provides a unique advantage for supporting the cutting deck on the mower and upon the ground. The deck will move relative the mower along the pivoting axis 93, corresponding to the hinge mounting of the deck to the adjacent deck 40. It is therefore only necessary to define a third point of support for the positioning of the deck. The rocker arm provides this third point of reference.

Figure 5:
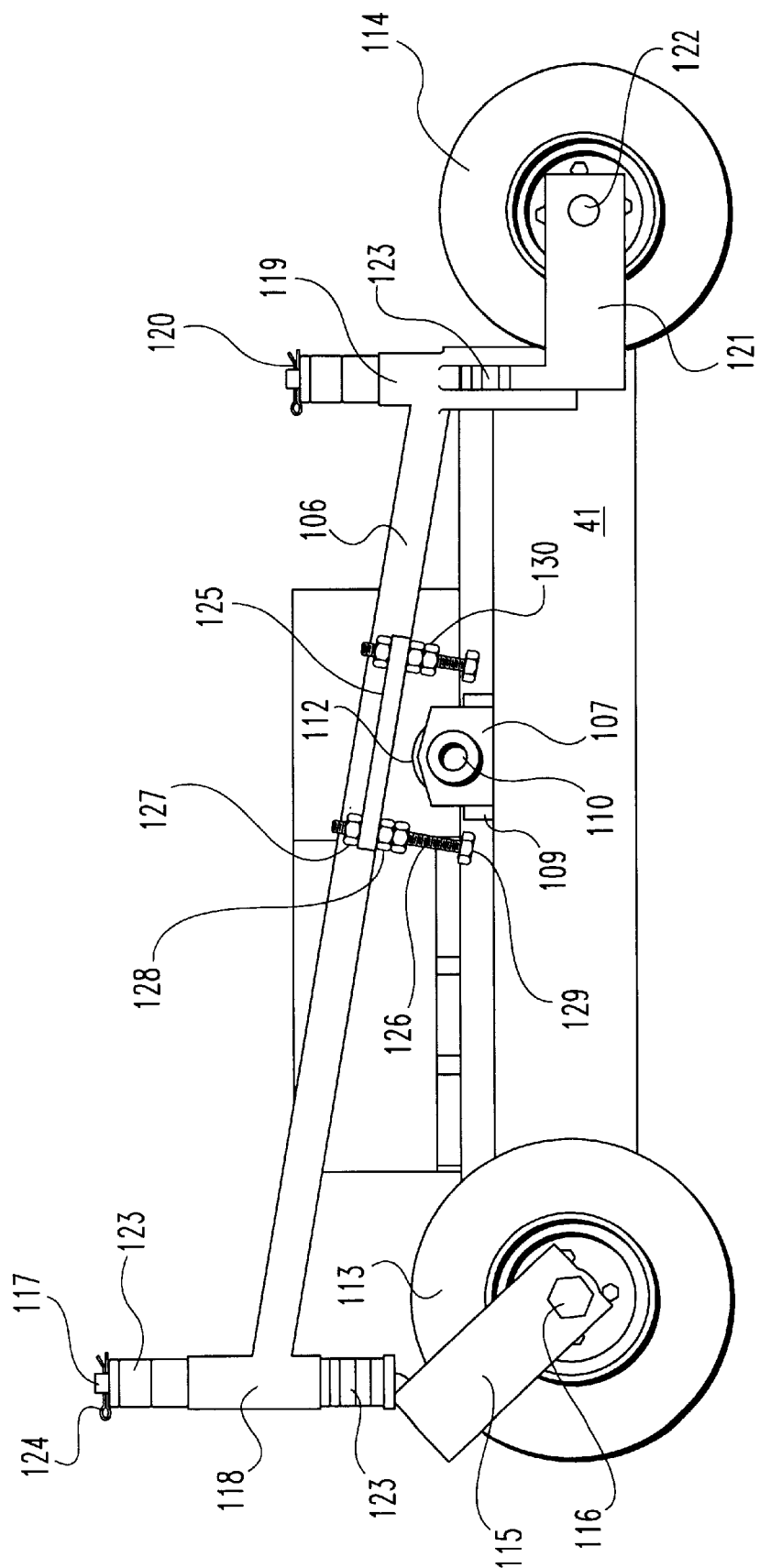
FIG. 5 is a side, elevational view of the portion of the mowing vehicle of FIG. 4.
Figure 6:
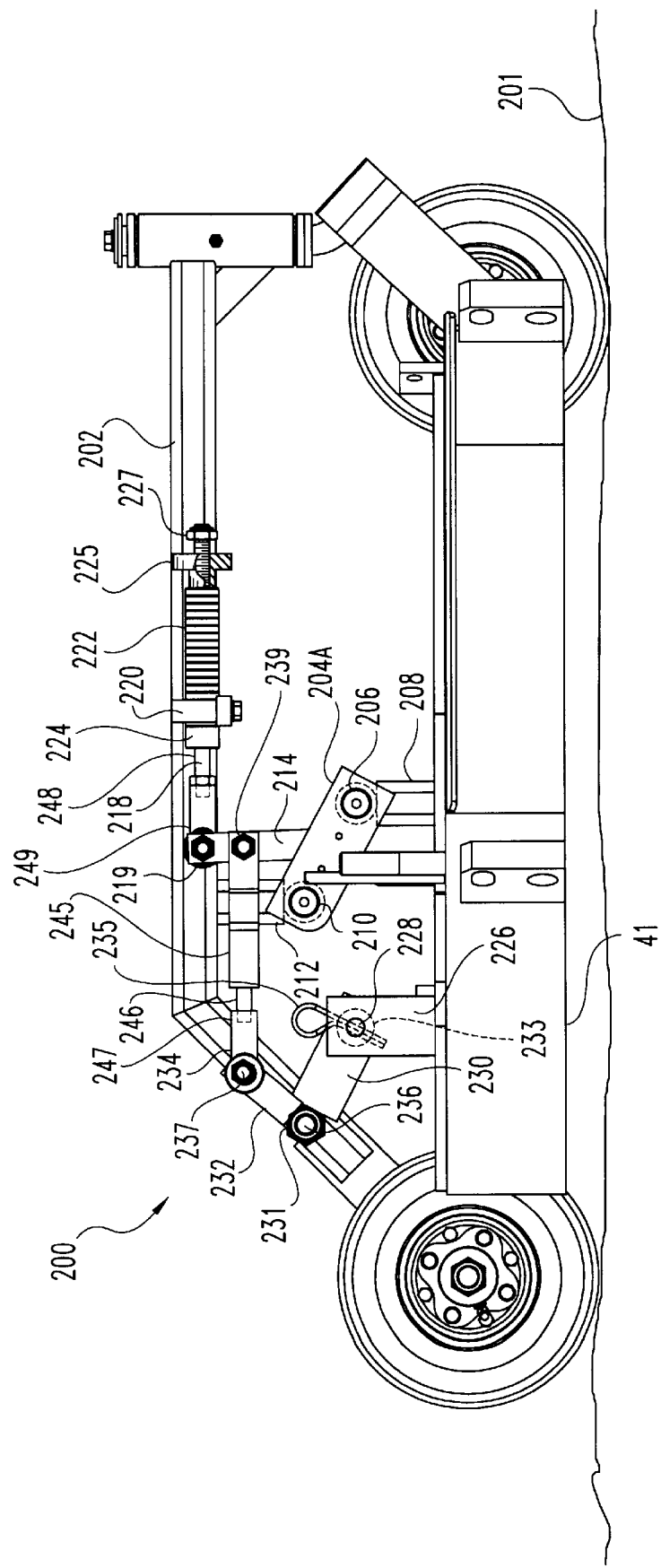
FIG. 6 is a side, elevational view of another embodiment of the rocker arm assembly of the apparatus for supporting a cutting blade on a mowing vehicle, and showing the cutting deck at the lowest cutting height.
Figure 7:
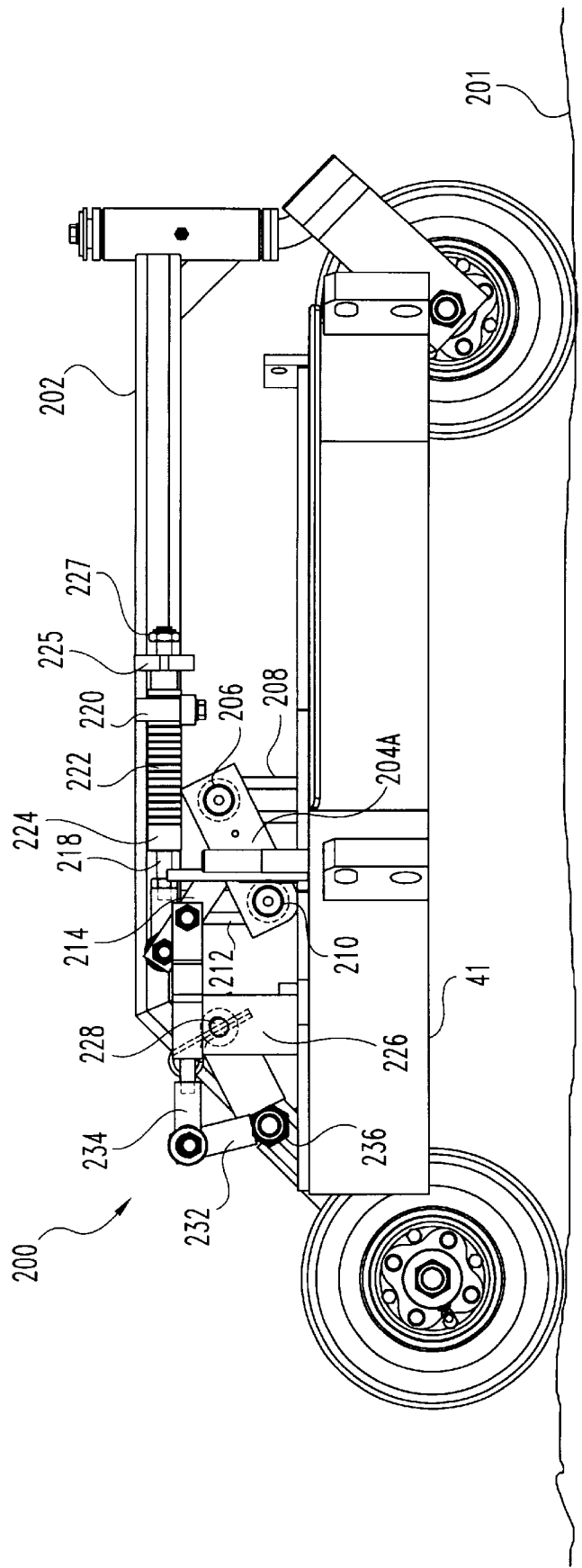
FIG. 7 is a side, elevational view of the rocker arm assembly of FIG. 6, and showing the cutting deck at the highest cutting height.
Figure 8:
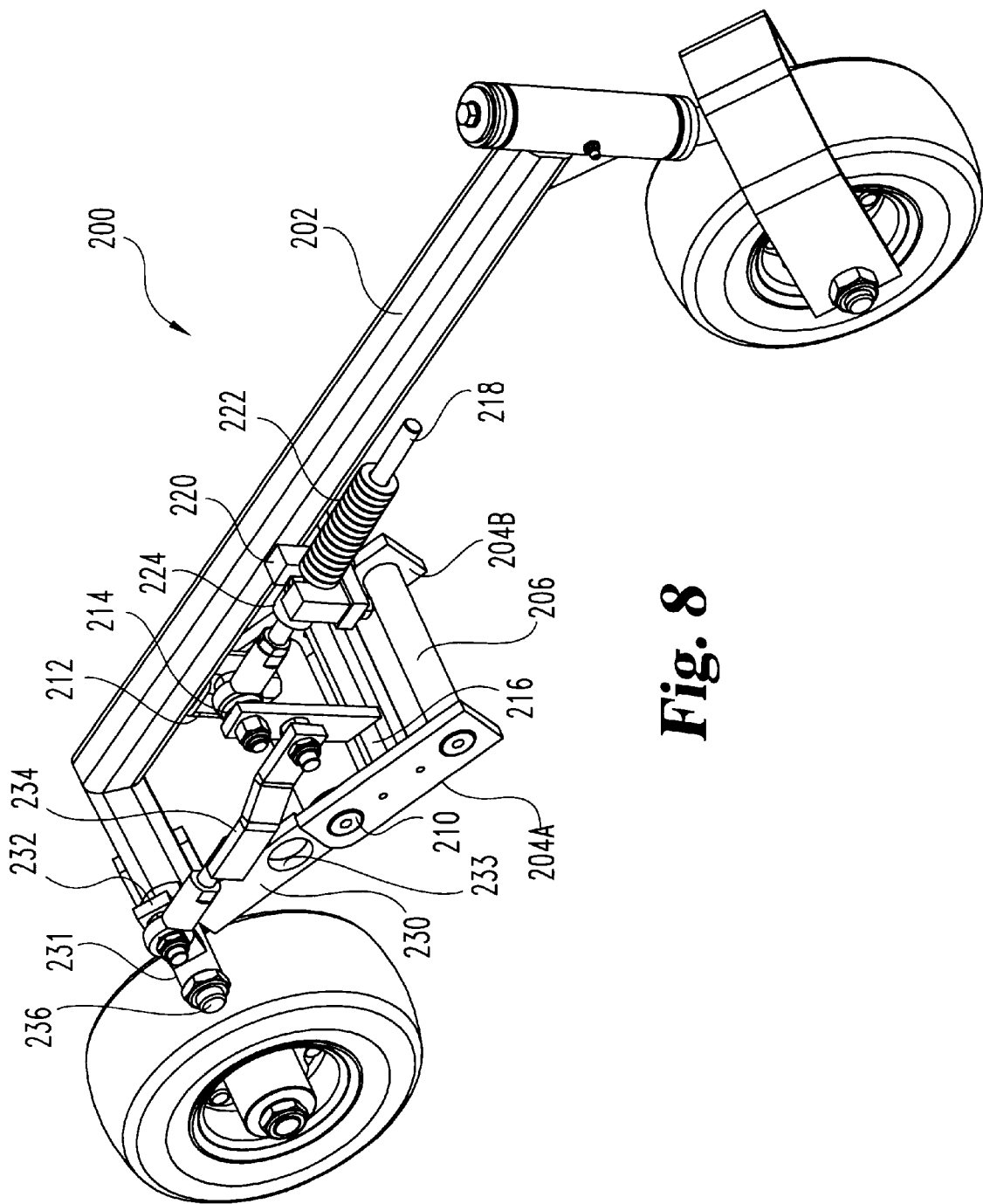
FIG. 8 is a perspective view of the rocker arm assembly of FIG. 6.
Figure 9:
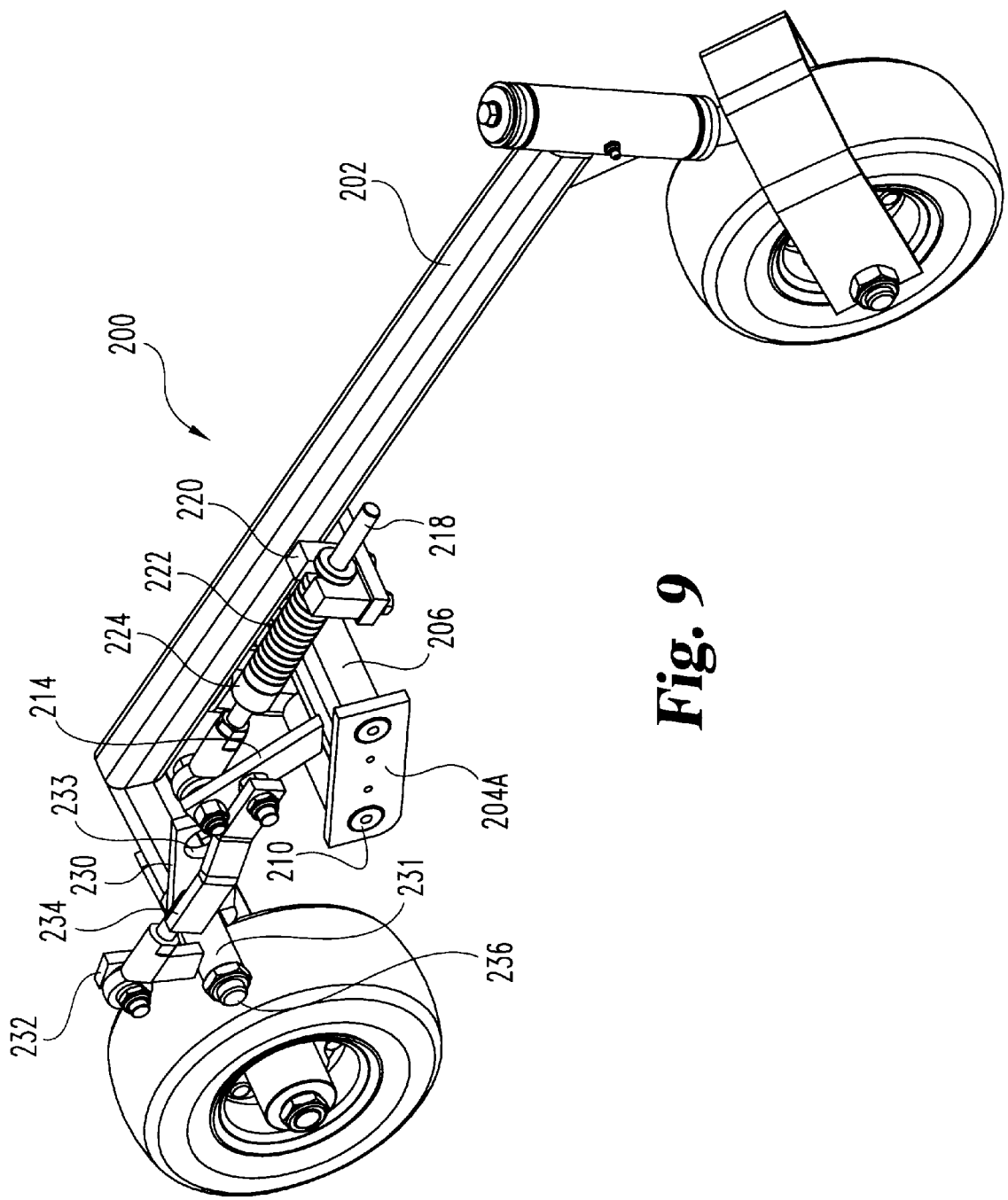
FIG. 9 is a perspective view of the rocker arm assembly of FIG. 7.

At the same time, the rocker arm is superior to alternate designs in that the wheels 113 and 114 are free to ride upon the ground and maintain contact despite hills or valleys that may be encountered. If the rocker are was not free to rotate about the horizontal axis of the support 111, then there would be instances when one or the other of the wheels would lose contact with the ground. For example, if the wheel 113 encountered a bump on the ground, then both wheels 113 and 114 would have to rise up together, and the cutting deck and blade would be raised unnecessarily high relative to the ground and the grass would be cut too high. By comparison, with the present rocker arm system the rear wheel 114 would remain in contact with the ground when the front wheel rises up over a bump, thereby providing a more uniform cutting of the grass despite the presence of such bumps. At the same time, the present design prevents over-rotating of the rocker arm 106. As shown in FIG. 5, limits are included to control the rotation of the arm. A plate 125 is secured to the rocker arm and extends in front of and behind the axis of rotation. A bolt 126 is received within a threaded hole of the plate and nuts 127 and 128 are positioned on opposite sides of the plate. The head 129 of the bolt is positioned to abut against deck 41 when the front of the rocker arm rotates downwardly a sufficient amount. Therefore, simple adjustment of the bolt 126 relative to the plate 125 allows for adjustment of the maximum extent of downward travel of the front of the rocker arm. A similar assembly 130 is provided on the rearward portion of plate 125 to limit downward travel of the back of rocker arm 106.

The limit control for the rocker arm is useful when certain types of terrain are encountered. For example, if there is a hole in the ground, then the front wheel 116 would normally drop down into the hole. This could cause difficulties in continued movement of the mower, or could cause scalping of the grass. However, when a hole is encountered the wheel is prevented from dropping into the hole any farther than the rocker arm limit permits. Thus, the wheel would begin to drop into the hole but will be stopped at the point that bolt 126 engages deck 41.

It will therefore be appreciated that the present invention provides an apparatus for supporting a cutting blade on a mower which has distinct advantages in terms of positioning the blade relative the grass to be cut. When bumps or the like are encountered, the rocker arm is free to rotate and thereby maintain the cutting blade in a more even position relative to the grass. When holes are encountered, the limits on the rocker arm maintain the cutting blade in a sufficiently high position relative to the ground.

The present invention is readily contrasted with conventional mounting systems of the prior art. In one approach, a pair of wheels would have been rigidly attached to the cutting deck, thus presenting the problem previously described with respect to having a wheel raise above the ground at times. If a single wheel is used at only the front or the rear of decks 41 and 42, then problems can occur when either high or low spots are encountered.

In addition, the present invention is useful in terms of the utility of the overall mower. As shown in FIG. 4, the rocker arm and respective wheels can be positioned to avoid interference with either side of the mower. On the left side in FIG. 4, the rocker arm and wheels are positioned so that the cutting blade can fully extend to the side of the mower, thereby allowing the mower to be used on that side for close edge trimming. On the other hand, the positioning of the rocker arm and wheels on the right side in FIG. 4 avoid interfering with the discharge chute for the mower.

Referring now to FIGS. 6–9, there is shown another embodiment of a rocker arm assembly 200 in accordance with the present invention. The rocker arm assembly 200 is positioned in FIG. 6 and FIG. 8 so as to maintain the cutting deck 41 at the lowest cutting height above the ground 201, while the rocker arm assembly 200 is positioned in FIG. 7 and FIG. 9 so as to maintain the cutting deck 41 at the highest cutting height. As explained in greater detail hereinbelow, the rocker arm assembly 200 of FIGS. 6–9 may be adjusted to provide for cutting deck heights between these two extremes.

Rocker arm assembly 200 includes a rocker arm 202 that is rotatably mounted to the cutting deck 41 and serves to support the outer portion of the deck upon ground 201. A pair of pivot plates 204A and 204B are pivotally coupled to the cutting deck 41 by means of a first pivot pin 206 extending therebetween. Pivot pin 206 extends through appropriate openings in a bracket 208 which extends upwardly from the top surface of the cutting deck 41. In this manner, pivot plates 204A and 204(B) are able to pivot as a unit about pivot pin 206 with respect to the cutting deck 41.

The opposite ends of pivot plates 204A and 204B are rotatably coupled by a second pivot pin 210 to a bracket 212 which extends downwardly from rocker arm 202. It can therefore be seen that cutting deck 41 may be raised or lowered by rotation of pivot plates 204A and 204B about pivot pins 206 and 210.

While the portions of rocker arm assembly 200 described above allow cutting deck 41 to be moved in a vertical direction, some means must be provided for securing cutting deck 41 at a desired cutting height. To this end, a linkage member 214 is fixedly attached at one end to a cross-member 216 which fixedly extends between pivot plate 204A and pivot plate 204B, as shown. The upper, opposite end of linkage member 214 is rotatably coupled to one end of a spacer bar 218 by a pivot pin 219. Spacer bar 218, in turn, rests within a U-shaped channel 220 which is fixedly attached to the rocker arm 202.

A bracket 226 extends upwardly from deck 41 and holds a limit pin 228. A pair of linkage members 230 and 232 are both rigidly connected to a sleeve 231 which is rotatably coupled to rocker arm 202 by a pivot pin 236. Linkage members 230 and 232 extend radially from sleeve 231 at about a 75° to 80° angle from one another. At the outboard end of linkage member 230 is defined a hole 233, the diameter of which is significantly larger than that of pin 228. Limit pin 228 is loosely trapped within hole 233 and held thereat by a quick-release pin 235. That is, linkage member 230 is juxtaposed between bracket 226 and quick-release pin 235. Linkage member 232 is pivotally connected at its outboard end to one end of linkage member 234 by a pivot pin 237, and linkage member 234 is pivotedly connected at its other end to linkage member 214 by a pivot pin 239, as shown. Linkage member 234 includes a link 245, a rod 246 and a ball end 247. Rod 246 is fixedly connected at one end to link 245 as by welding, and is threadedly received within an axial hole in ball end 247. The overall length of linkage member 234 is therefore adjustable. Likewise, spacer bar 218 includes a ball end 249 that is pivotally connected at pin 219 to linkage member 214, and includes a rod 248 that is threadedly received within an axial bore in ball end 249. The overall length of spacer bar 218 is therefore also adjustable to fine tune the static configuration of rocker arm assembly 200.

As seen in FIGS. 6–9, a closed linkage system is created among deck 41, bracket 226, linkage member 230, rocker arm 202, bracket 212, pivot plates 204A and 204B, and bracket 208. The linkage connection of linkage member 232, linkage member 234 and linkage member 214, with spacer bar 218 pivotally connected thereto at pin 219, permits adjusting articulation to the closed linkage system and therefore to deck 41. The configuration of the closed linkage system may be varied between that shown in FIG. 6 and that shown in FIG. 7, among other ways, by varying the distance of spacer bar 218 between pivot pin 219 and U-shaped channel 220. This is accomplished with the use of a plurality of spacer washers 222, end stop 224, and lock knob 225. Inner end stop 224 is welded to spacer bar 218 to define the innermost limit of washers 222. Lock knob 225 is internally threaded and screws onto the outboard end of spacer bar 218 to secure spacer bar in place, with spacer washers 222, in U-shaped channel 220. An internally threaded lock nut 227 is screwed onto the outboard end of spacer bar 218 to prevent lock knob 225 from becoming unscrewed due to the vibration of the mower.

In operation, to raise the height of deck 41 relative to rocker arm 202 and thus relative to ground 201, lock nut 227 and knob 225 are loosened; spacer bar 218 is lifted up and out of U-shaped channel 220; and, spacer bar 218 is moved horizontally to the left (as viewed in FIG. 6) which generally translates linkage member 234 to the left which (1) pivots linkage member combination 232/230 counterclockwise about pin 236 thus raising bracket 226 and deck 41 and (2), in combination with the translation of spacer bar 218, pivots and translates linkage member 214, which pivots pivot plate combination 204A/204B counterclockwise about pin 210, thus raising bracket 208 and deck 41. When deck 41 has been raised to the desired height, spacer washers 222 are slid along spacer bar 218 to the appropriate position, and spacer bar 218 is lowered back into U-shaped channel 220. Knob 225 and lock nut 227 are then tightened to lock deck 41 in place. Thus, when deck 41 is in the lowermost position of FIG. 6, all the washers 222 are positioned to the right of U-shaped channel 220, and when deck 41 is in the upper-most position of FIG. 7, all of washers 222 are positioned to the left of U-shaped channel. Intermediate heights of deck 41 can be defined by having a certain number of washers 222 on either side of U-shaped channel 220. The weight of deck 41 biases deck 41 to the lowermost position of FIG. 6. Lowering of deck 41 from the high position (as in FIG. 7) to or toward the lowermost position (FIG. 6) is, of course, accomplished by a manipulation of spacer bar 218, as described above, but in reverse.

In practice, deck 41 is supported primarily through bracket 208, pin 206, pivot plates 204A/204B and linkage member 212. When rocker arm assembly 200 is adjusted as described, and pivot plates 204A/204B are pivoted, which raises or lowers pivot pin 206, the oversized hole 233 in linkage member 230 is raised or lowered a substantially identical amount. The combination of pin 228 of bracket 226, trapped for limited movement within oversized hole 233, provides for limited angular movement of rocker arm 202 over variable terrain, as with the plate 125 and bolts 126 of the embodiment of FIG. 5. That is on level ground, pin 228 will be centered within hole 233, and pin 228 may ride up and down a limited amount within hole 233 during normal operation as uneven terrain is encountered. This limited movement of pin 228 defines the limited movement of rocker arm 202 in response to the uneven terrain encountered by the rocker arm wheels. The difference in diameters of pin 228 and hole 233 may be designed to any value desired to define the limits of variability of rocker arm 202. Further, by adjusting the length of linkage member 234, the position of hole 233 in relation to pin 228 may be varied. In the preferred embodiment, linkage member 234 is adjusted to position pin 228 in the center of hole 233 when the mower is on level terrain. It should be understood that pin 228 and hole 233 may be shaped other than circular (such as a slot and pin) to operate as intended. This configuration allows the user to make a single adjustment of spacer bar 218 to change the cutting height without encountering a concomitant change in the permitted range of differential vertical movement of the front and rear wheel positions relative to each other.

It will be appreciated that the height adjustment arrangement of the embodiment of FIGS. 6–9 is substantially easier to use than the height adjustment provided by the spacers 123 in the embodiment of FIG. 5. In the prior embodiment, it is necessary to raise the deck high enough off the ground to disassemble each of the wheels of the rocker arm assembly in order to gain access to the spacers 123 for the purpose of adding or removing spacers. In contrast, the rocker arm assembly 200 of FIGS. 6–9 simply requires lifting the spacer bar 218 from within U-shaped channel 220, translating spacer 218 horizontally, sliding spacer washers 222 thereon to the appropriate position; and, repositioning spacer bar 218 within U-shaped channel 220.

Figure 10:
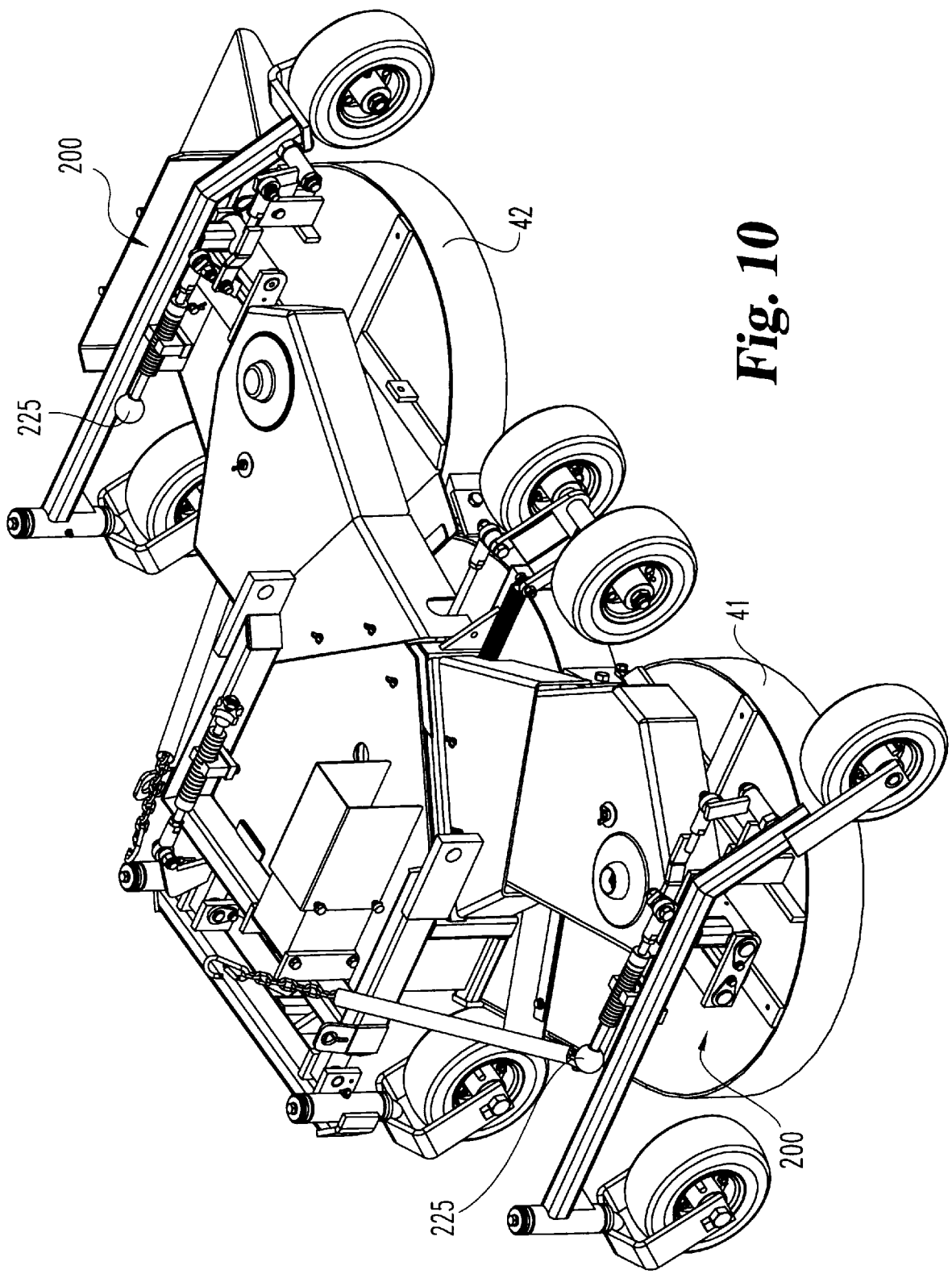
FIG. 10 is a perspective view of multiple cutting decks supported by a plurality of the rocker arm assemblies of FIG. 6.
Figure 11:
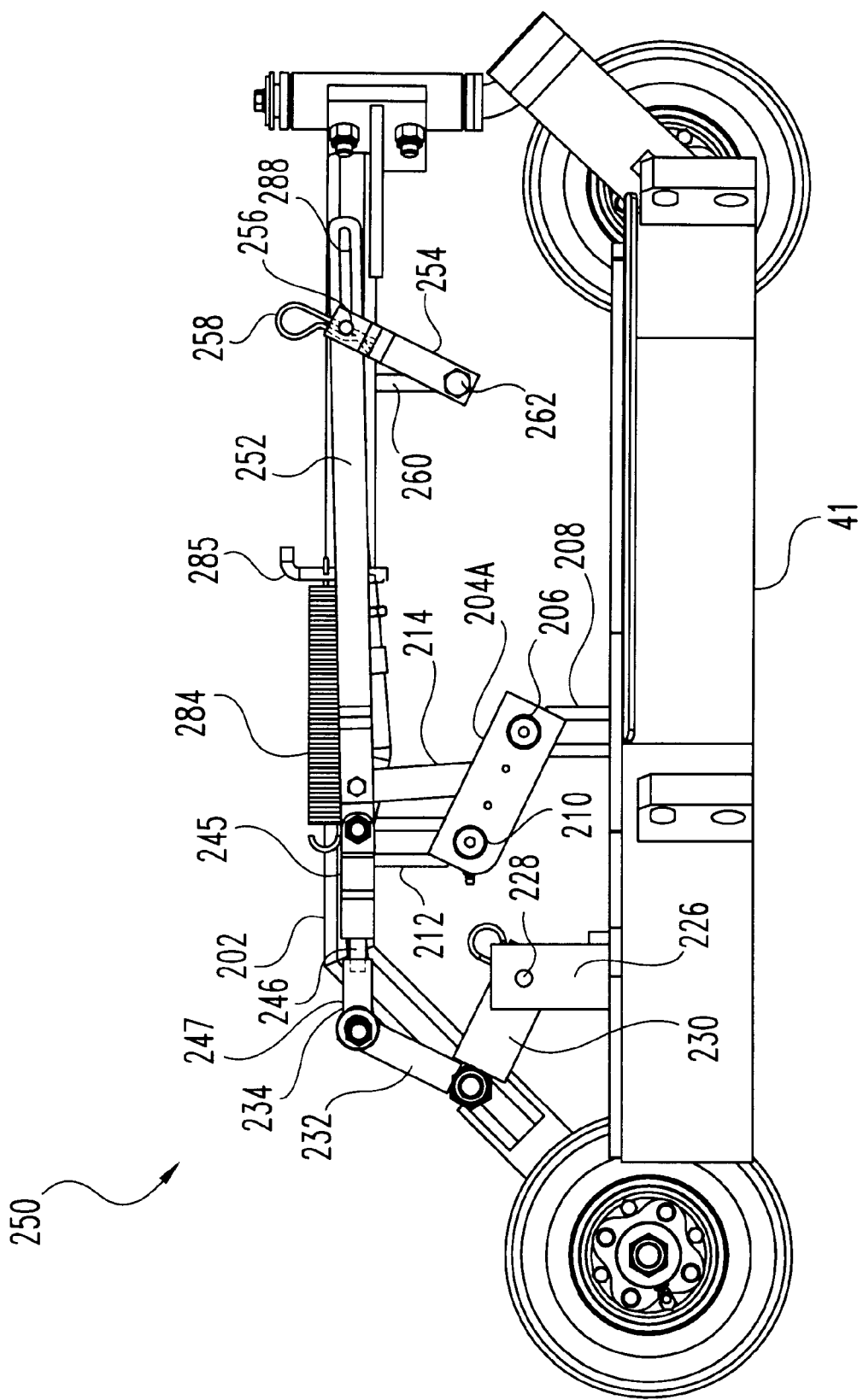
FIG. 11 is a side, elevational view of a another embodiment the rocker arm assembly of the apparatus for supporting a cutting blade on a mowing vehicle, and, showing the cutting deck at the lowest cutting height.
Figure 12:
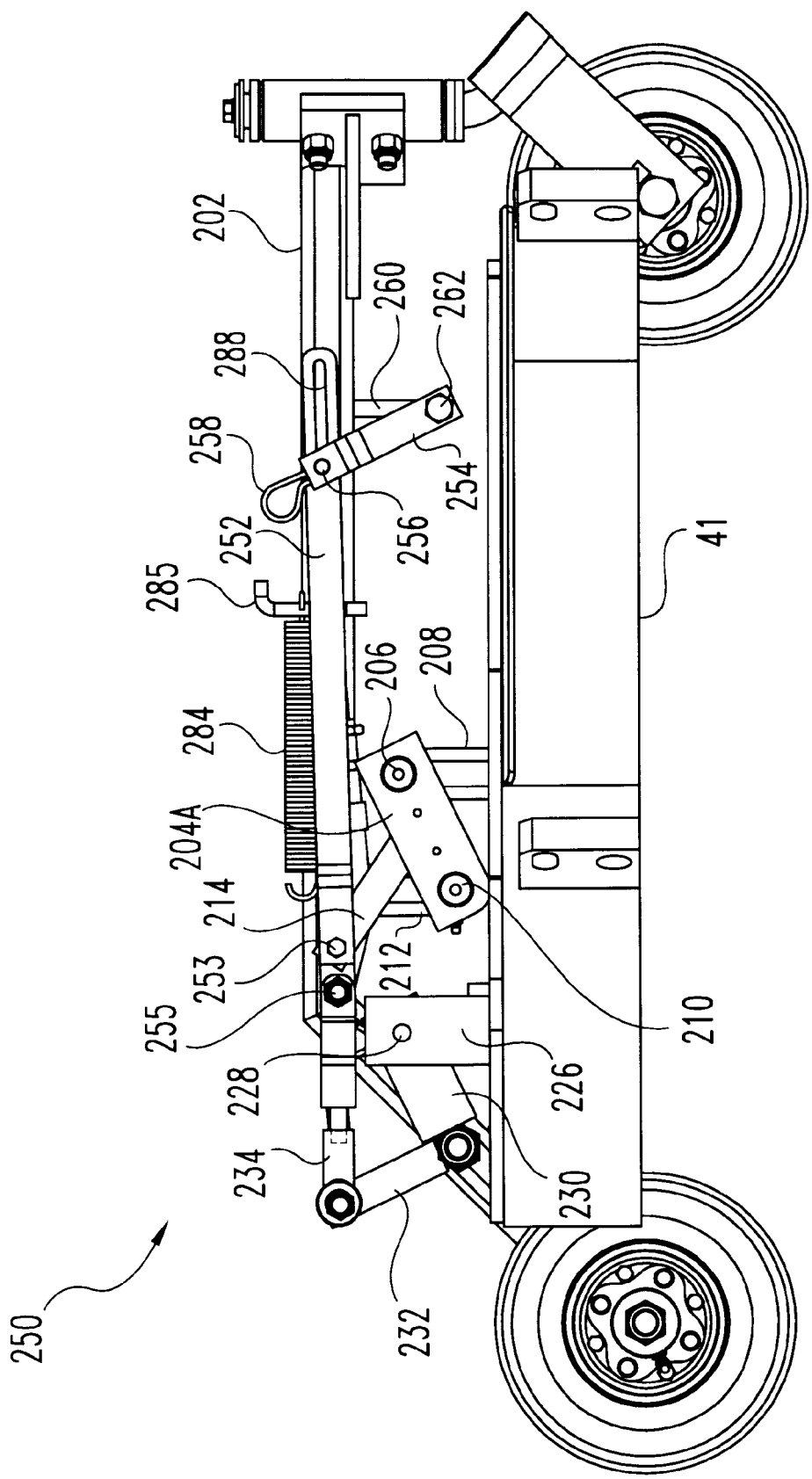
FIG. 12 is a side, elevational view of the apparatus of FIG. 11, and showing the cutting deck at the highest cutting height.

FIG. 10 shows a pair of the rocker arm assemblies 200 in use on a three-blade mower similar to that illustrated in FIG. 4. It can be seen that the rocker arm assemblies 200 conveniently provide placement of the support wheels at the cutting edge of the mower, while not interfering with edge cutting or side-discharge of the clipped grass. Furthermore, the controls for raising or lowering the cutting decks are easily accessible on either side of the mower.

Although rocker arm assembly 200 of FIGS. 6–10 increases the ease with which the cutting deck 41 may be raised and lowered in comparison to the embodiment of FIGS. 1–5, the embodiment of FIGS. 6–10 still requires that the mower operator dismount the mower and perform the height adjustment at each of the rocker arm assemblies 200. Because it is preferable that the operator of the mower be able to adjust the height setting of each rocker arm assembly without dismounting from the mower, a third embodiment rocker arm assembly of the present invention is illustrated in FIGS. 11–15, and indicated generally at 250. Rocker arm assembly 250 is positioned in FIG. 11 and FIG. 13 so as to maintain cutting deck 41 at the lowest cutting height, while the rocker arm assembly 250 is positioned in FIG. 12 and FIG. 14 so as to maintain cutting deck 41 at the highest cutting height. As explained in greater detail below, the rocker arm assembly 250 of FIGS. 11–15 may be adjusted by the mower operator from the mower operating position in order to provide for cutting deck heights between these two extremes.

Generally, the design of rocker arm assembly 250 is similar to rocker arm assembly 200, and like reference numerals are used in FIGS. 11–15 to designate parts equivalent to those described hereinabove with respect to FIGS. 6–10. Rather than adjusting the height of the cutting deck 41 by means of the spacer bar 218 and the spacers 222, rocker arm assembly 250 utilizes a positioning bar 252 that is rotatably coupled to the linkage member 214 at pivot pin 253 to raise and lower the cutting deck 41. As shown in FIGS. 11–14, linkage member 234 extends directly from linkage member 232 at pivot pin 255 to positioning bar 252 instead of to linkage member 214, as was the case in the rocker arm assembly 200.

The opposite end of the positioning bar 252 is pivotally coupled to a lever arm 254 via a pin 256. A quick-release pin 258 (FIGS. 11 and 12 only) may be used to facilitate maintenance. The other end of the lever arm 254 is pivotably coupled through a pin 262 to a bracket 260, which extends rigidly downwardly from the rocker arm 202.

Figure 13:
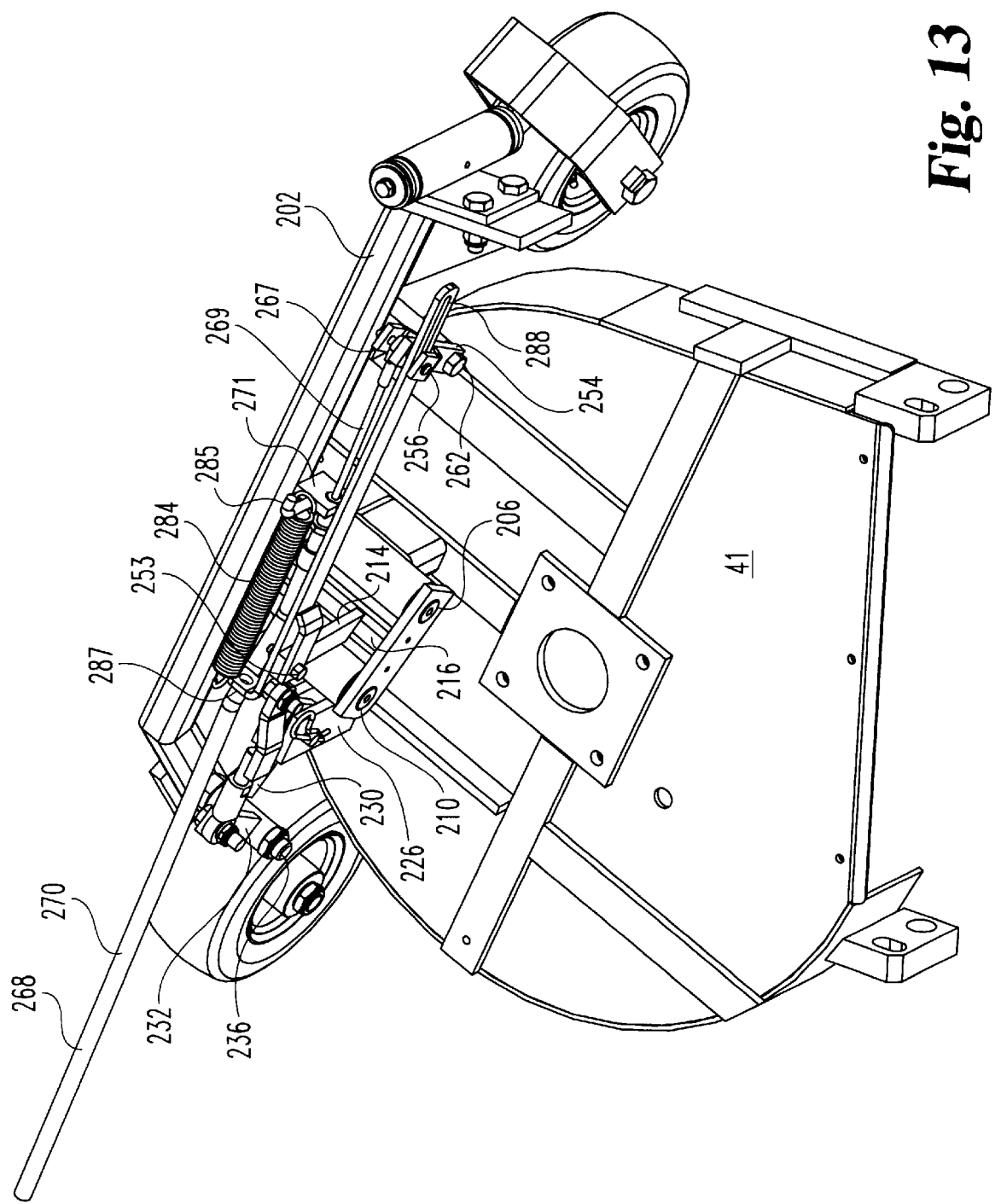
FIG. 13 is a perspective view of the apparatus of FIG. 11.
Figure 14:
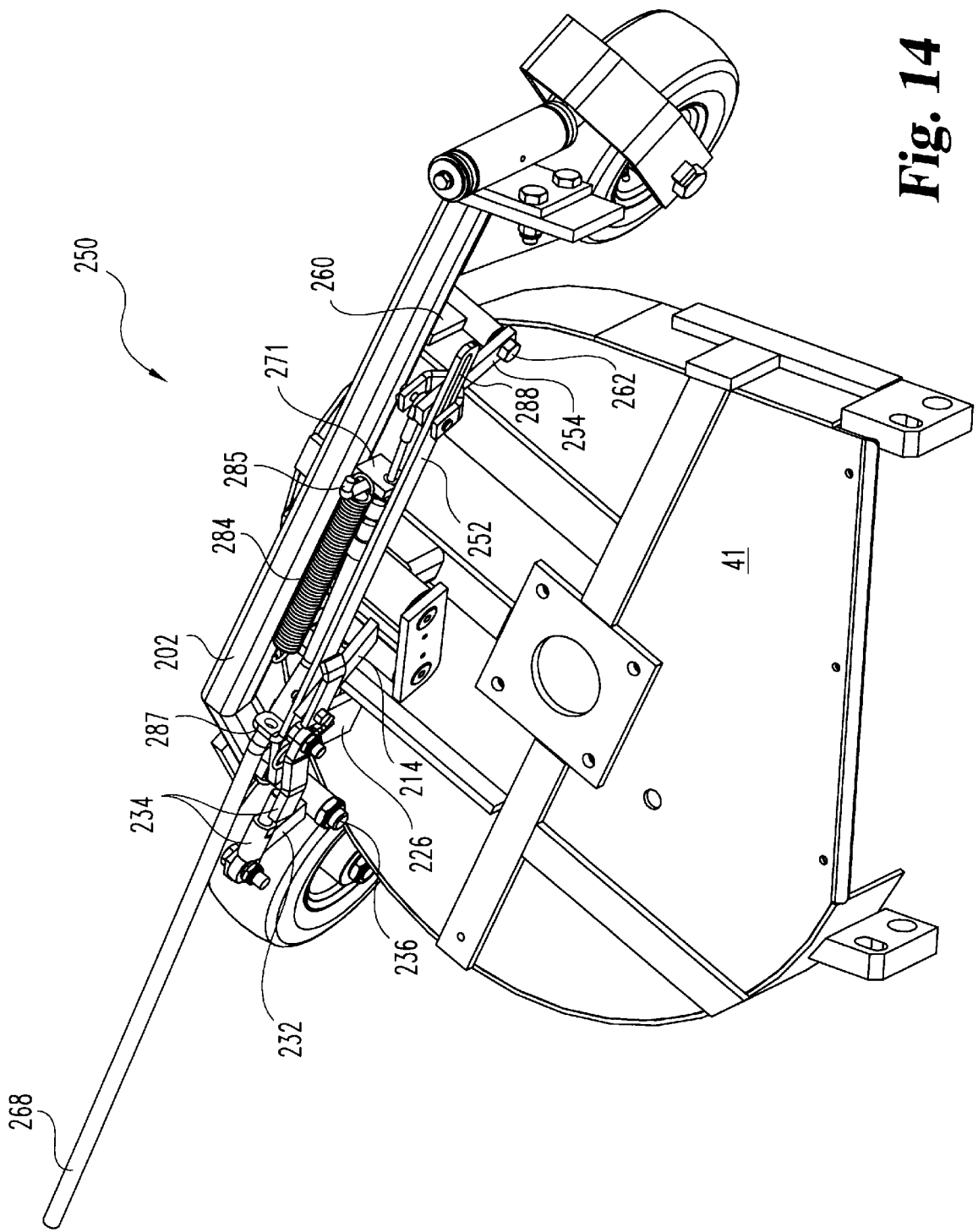
FIG. 14 is a perspective view of the apparatus of FIG. 12.
Figure 15:
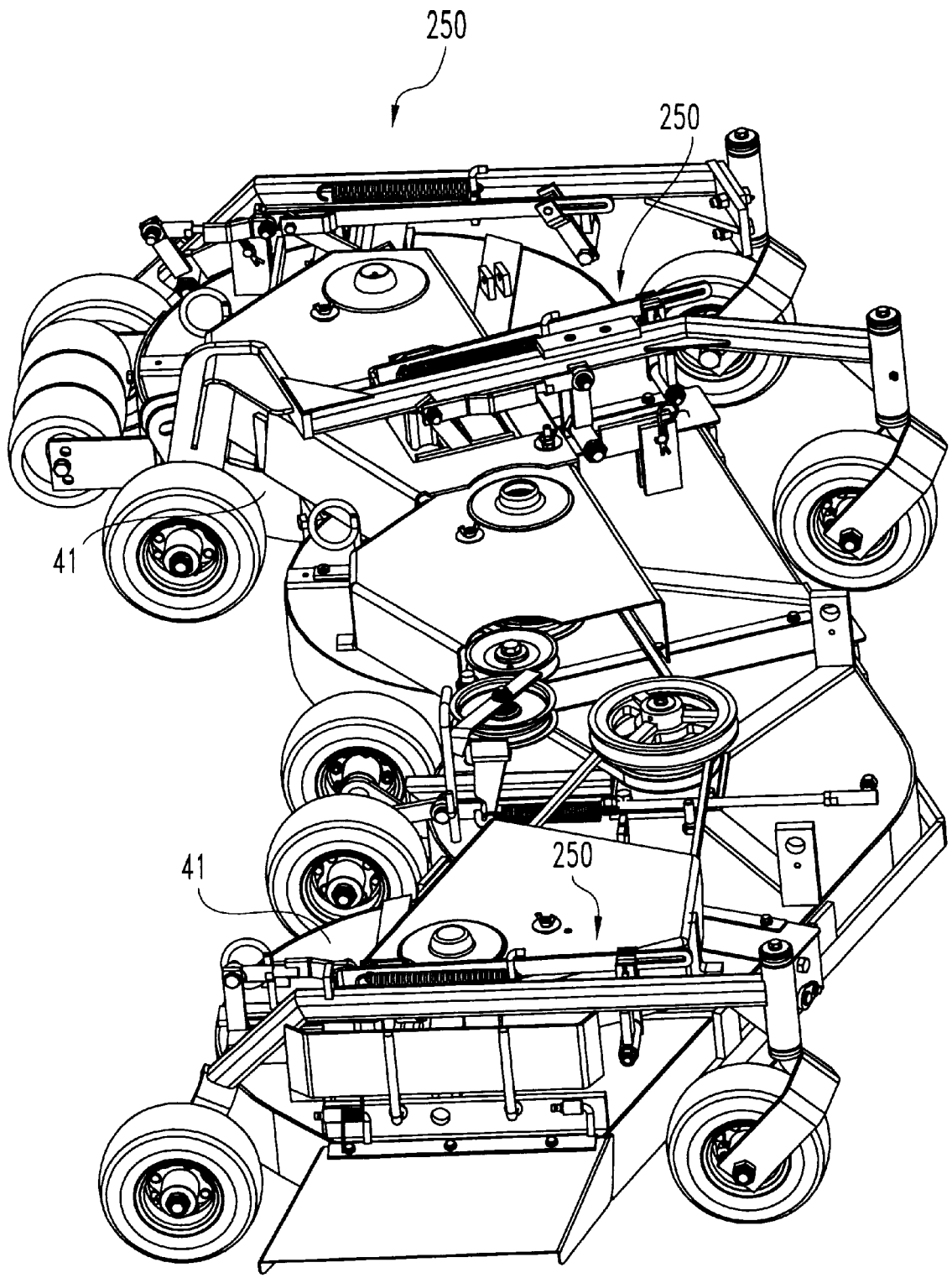
FIG. 15 is a perspective view of multiple cutting decks supported by a plurality of the rocker arm assemblies of FIG. 14.
Figure 16:
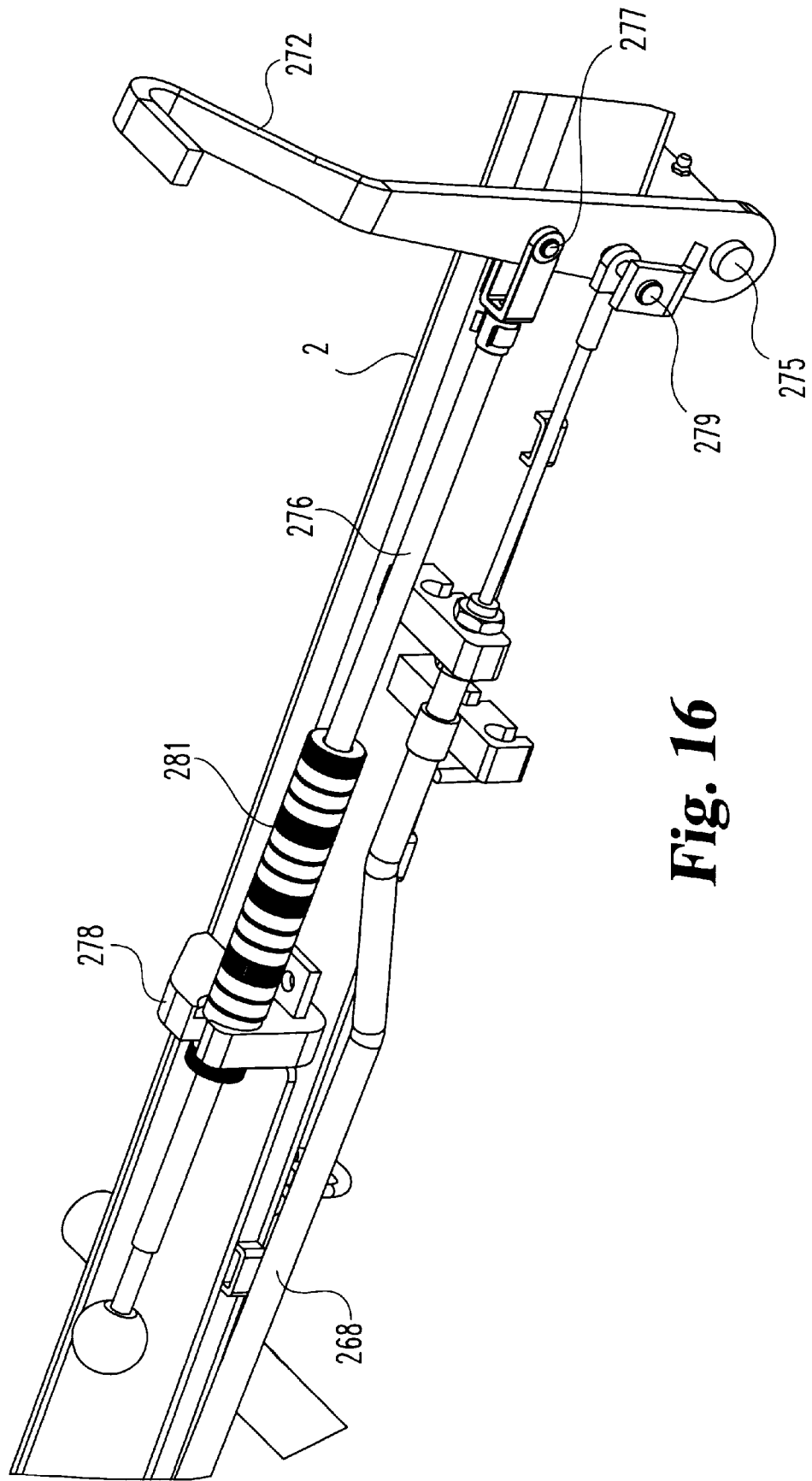
FIG. 16 is a perspective view of the foot pedal arrangement for remote operation of the rocker arm assemblies of the apparatus of FIG. 13.
Figure 17:
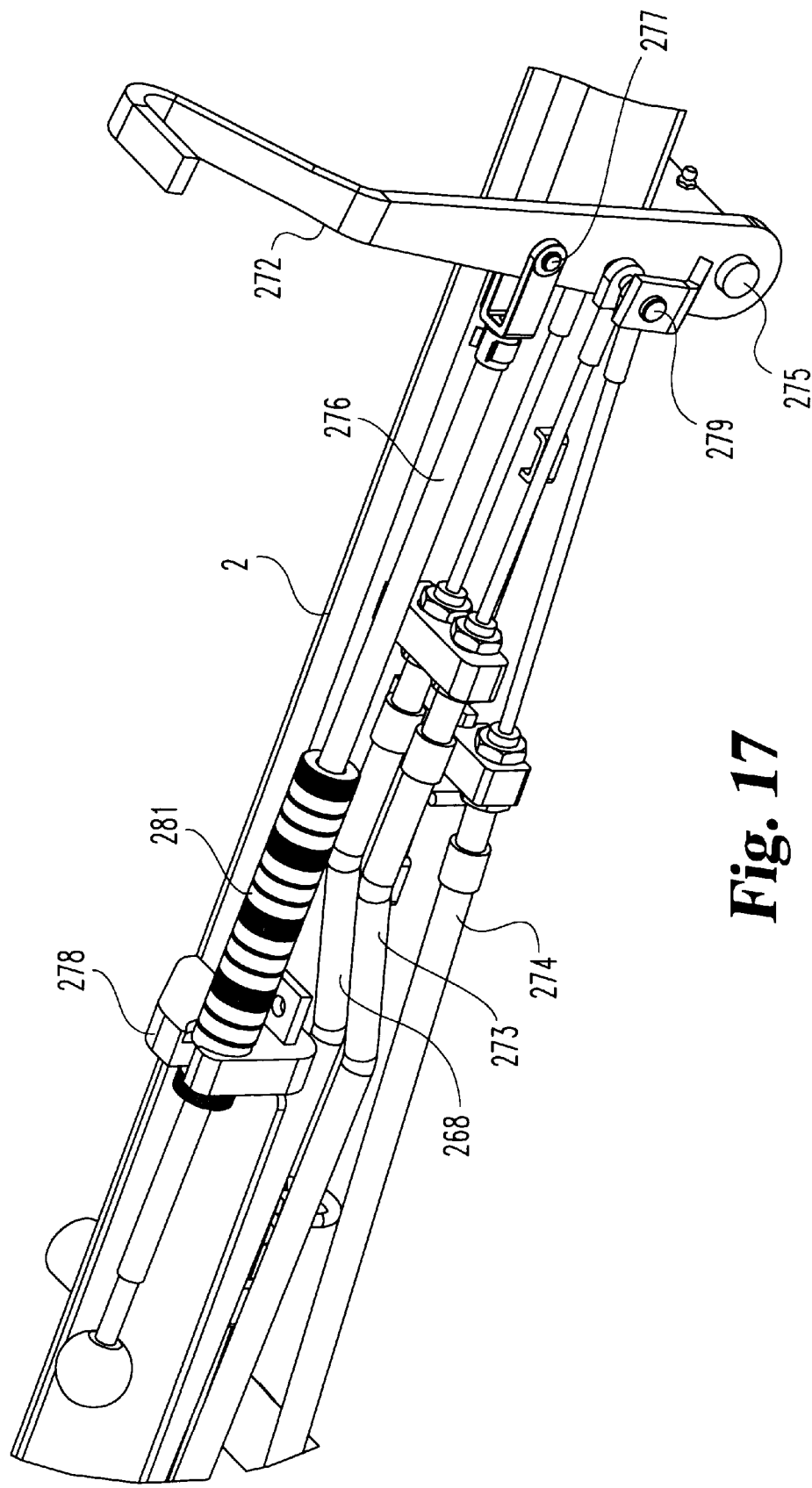
FIG. 17 is a perspective view of the foot pedal arrangement of FIG. 16, but showing an arrangement for remote operation of multiple rocker arm.
Figure 18:
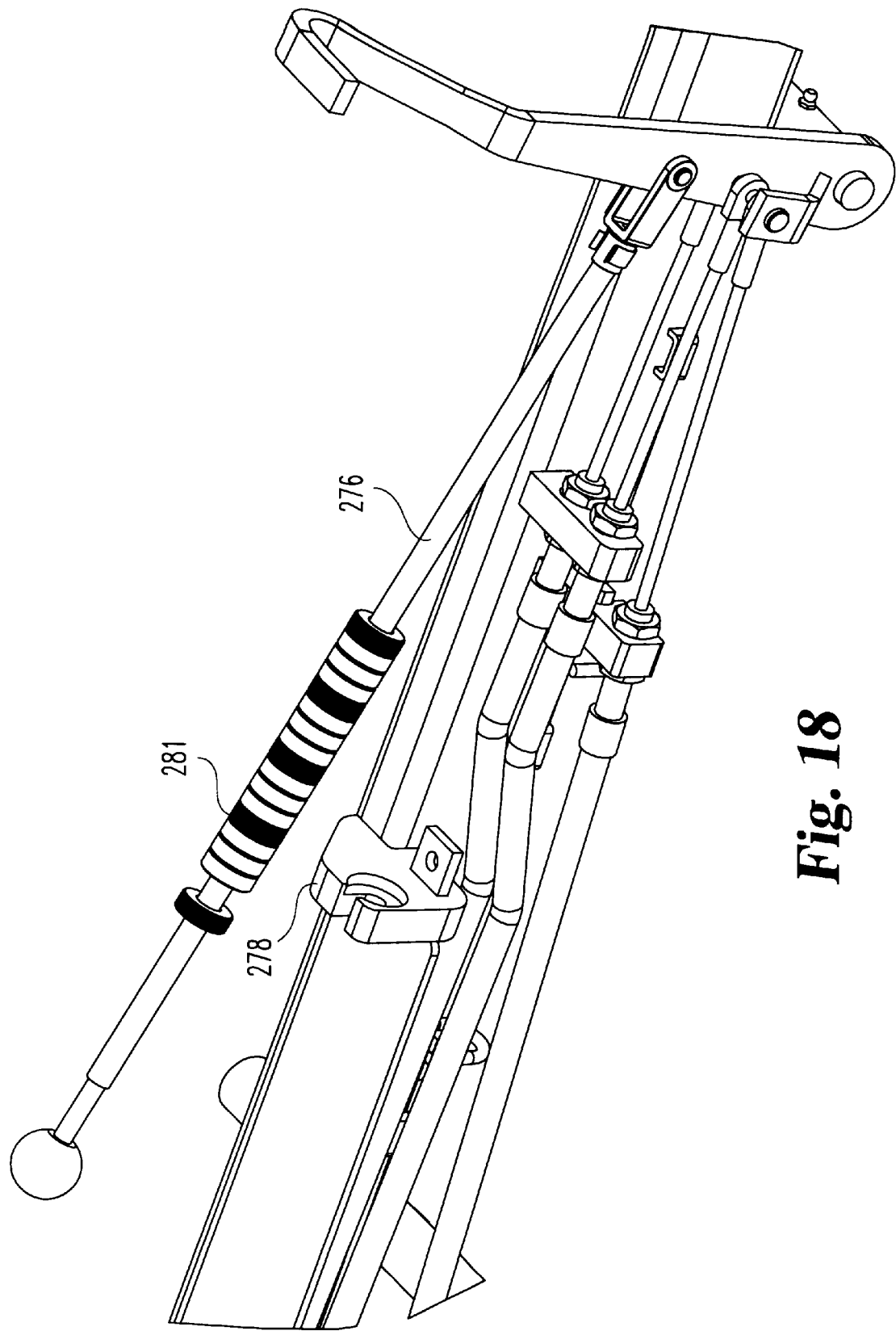
FIG. 18 is a perspective view of the foot pedal arrangement of FIG. 17, but showing the spacer bar 276 in mid-adjustment.

As seen in FIGS. 11–14, horizontal movement of the positioning bar 252 to the left or to the right will act through the linkage member 214 and the pivot plates 204A and 204B to cause vertical movement of cutting deck 41 in a manner similar to that for rocker arm assembly 200 of FIGS. 6–9. In order to raise or lower all of the cutting decks 41 of a multiblade mower at the same time, it will be necessary to move several different positioning bars 252 simultaneously. That is because, as shown in FIG. 15, a multiblade mower may incorporate two or more rocker arm assemblies 250 in support of its various cutting decks 41, and the operator of the mower have the ability to move all of the positioning bars 252 at the same time without having to dismount from the mower. A cable assembly, tie rod or other similar arrangement is provided to allow the mower operator to move all positioning bars 252 from the mower operator's seat simultaneously. As shown in FIGS. 13 and 14, attachment of such remote actuation hardware may be accomplished by a control cable 268 that is anchored at anchor bracket 271 which is fixed to rocker arm 202. The inner cable member 269 of cable 268 extends out from cable sheath 270 at anchor bracket 271, and the distal end 267 of cable member 269 connects to lever arm 254 and positioning bar 252 at pin 256.

Cable 268 is a "pull" type cable. That is, it can be pulled but not pushed with any significant force through sheath 270. Because gravity biases deck 41 to the lowermost position whereby positioning bar 252 is extended to the right, as shown in FIG. 13, movement of positioning bar 252, and thus deck 41, may be accomplished with the aid of gravity in one direction and by pulling positioning bar 252 to the left in the opposition direction. It is realized, however, that occasionally deck 41 and/or the corresponding linkage members may stick in a position and not readily drop toward the lowermost position. To assist gravity in biasing deck 41 to the lowermost position, a spring 284 is provided. Spring 284 is shown in FIGS. 11–14 connected at its forward end to a hook 285 extending upwardly from anchor bracket 271. The rearward end of spring 284 is shown unconnected in FIGS. 11–14, but is connectable to a flange 287 that extends outwardly from and at the rear of positioning bar 252. Mounted in tension between hook 285 and flange 287, spring 284 will bias positioning bar 252 to the right, as viewed in FIGS. 11–14, and assist gravity in biasing deck 41 downwardly.

At its connection to the distal end 267 of cable member 269, the forward end of positioning bar 252 is provided with a slot 288 rather than a hole. Pivot pin 256 extends through slot 288 and couples with cable end 267 and the top of lever arm 254. This configuration provides for unexpected upward movement of deck 41 as, for example, when the front wheel of the mower falls into a hole and deck 41 bottoms out on the ground. The sudden upward movement of deck 41 relative to rocker arm 202 would cause positioning bar 252 to pull backward (to the left in FIGS. 13 and 14). If pin 256 was coupled with positioning bar 252 through a hole in bar 252 instead of a slot, cable member 269 would bunch up or kink which could eventually cause the cable to fail. Because of slot 288, however, cable member stays in whatever extended position it is in (FIG. 13, for example) and positioning bar 252 can momentarily pull backward (to the position shown in FIG. 14, for example).

Figure 19:
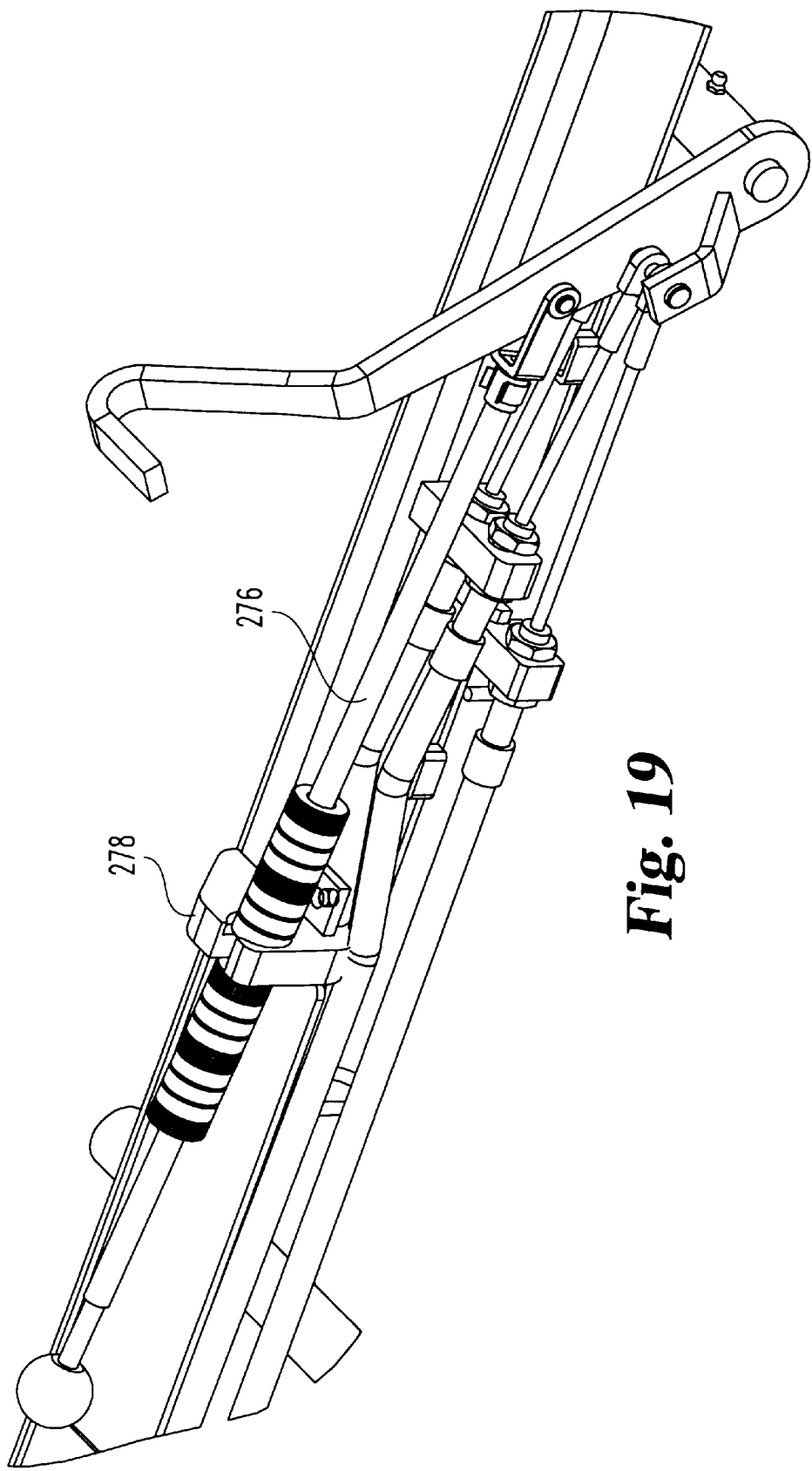
FIG. 19 is a perspective view of the foot pedal arrangement of FIG. 17, but showing the spacer bar 276 after adjustment.

FIGS. 16–19 illustrates a method by which the opposite end of one (FIG. 16) or more (FIG. 17) cables 268, 273 and 274 can be grouped and attached by a pin 279 at a remote foot pedal 272 and activated to remotely operate rocker arm assemblies 250. Foot pedal 272 is attached to the frame 2 of the mower by pivot pin 275 A spacer bar 276 is pivotally attached to foot pedal 272 by pin 277, and the relative position of the cable can be controlled by changing the relative position of spacer bar 276 in relation to U-shaped channel 278 that is rigidly attached to the mower frame 2. In order to maintain this relative spacing, a plurality of spacer washers 281 are captured on spacer bar 276 on either side of the U-shaped channel 278. The length of the cable may then be changed by lifting spacer bar 276 out of the U-shaped channel 278 (FIG. 18) and positioning a desired number of the spacers washers 281 on either side of U-spaced channel 278 and then positioning spacer bar 276 back into U-shaped channel 278 in the new position (FIG. 19). Alternate configurations are contemplated whereby push/pull cables could be used, with or with spring assist, to position positioning bar 252 to alter the deck heights uniformly. Alternatively, other manual methods of adjustment are contemplated as are configuration incorporating 272 remotely powered means such as hydraulic or electric actuators. It will be appreciated by those having ordinary skill in the art that other attachment points may be used in order to couple the remote actuation mechanism to the positioning bars 252.

Alternative embodiments are contemplated wherein the linkage connecting rocker arm 202 with deck 41 are of varying shapes and configurations. By way of example, but not intended to limit the possible variations, a single, particularly configured pivot plate could be used in lieu of pivot plates 204A and 204B and linkage member 214, the single pivot plate being pivotally connected to rocker arm 202, to deck 41 and to spacer bar 218. Likewise, bracket 212 could be an integral part of rocker arm 202, bracket 208 could be an integral part of deck 41, and/or bracket 226 could be an integral part of deck 41. Likewise, a single, particularly shaped linkage member could be used in lieu of linkage members 230 and 232 and sleeve 231, the single lingage member being rotatably mounted to rocker arm 202 and to linkage member 234 and defining the limit hole 233. It is further contemplated that the limit relationship between rocker arm 202 and deck 41 could be embodied in alternative structure. For example, and in no way limiting, linkage member 230 could be directly pivotally connected to bracket 226, and an oversized hole and pin combination or other equivalent structure could be provided between linkage members 232 and 234.

While the invention has been illustrated and described in detail in the drawings and foregoing description, the same is to be considered as illustrative and not restrictive in character, it being understood that only the preferred embodiment and certain other examples have been shown and described and that all changes and modifications that come within the spirit of the invention are desired to be protected.

What is claimed is:

1. An apparatus for supporting a cutting blade on a mower, comprising:
    a rotatable shaft secured to the cutting blade;
    a support member having first and second generally opposing sides and holding said shaft and blade for rotation between the opposing sides, said support member being mounted at the first side to the mower to pivot about a first generally horizontal axis;
    a rocker arm having first and second ends and a longitudinal axis;
    a ground support wheel rotatably mounted at each of the first and second ends of said rocker arm; and,
    linkage coupling the second end of said support member to said rocker arm to support said support member from said rocker arm whereby said rocker arm rotates relative said support member about a second generally horizontal axis that is not parallel to the longitudinal axis.

2. The apparatus for supporting a cutting blade of claim 1 wherein said linkage is adjustable to vary the position of said support member vertically relative to said rocker arm.

3. The apparatus for supporting a cutting blade of claim 1 wherein said linkage includes a limit assembly connected between said rocker arm and said support member, the limit assembly defining the limits said rocker arm can pivot relative to said support member.

4. The apparatus for supporting a cutting blade of claim 3 wherein said linkage includes a pivot plate pivotally connected at a first point to said rocker arm and at a second point to said support member.

5. The apparatus for supporting a cutting blade of claim 4 wherein said linkage includes a bar connected to the pivot plate and adjustably lockable to said rocker arm to lockably vary the angular attitude of the pivot plate in relation to said rocker arm and said deck and thereby lockably vary the vertical position of said deck in relation to said rocker arm.

6. The apparatus for supporting a cutting blade of claim 5 wherein the bar is pivotally connected to said pivot plate.

7. The apparatus for supporting a cutting blade of claim 6 wherein said limit assembly includes a first linkage member rotatably connected at a third point to said rocker arm, pivotally coupled with one of said pivot plate and said deck to rotate at the third point whenever said one of said pivot plate and said deck moves, and coupled with the other of said pivot plate and said deck to limit movement of said deck relative to said rocker arm.

8. The apparatus for supporting a cutting blade of claim 7 wherein the first linkage member is pivotally coupled to rotate at the third point whenever said pivot plate moves.

9. The apparatus for supporting a cutting blade of claim 8 wherein one of the first linkage member and said deck defines an opening and the other of the first linkage member and said deck includes a limit pin sized to be received for limited movement within the opening to constrain said deck to a limited range of motion relative to the first linkage member.

10. The apparatus for supporting a cutting blade of claim 9 wherein the first linkage member defines the opening and said deck includes the limit pin, the linkage assembly further including a locking member removably connected to the limit pin to constrain the limit pin to movement within the opening.

11. The apparatus for supporting a cutting blade of claim 10 wherein the first linkage assembly further includes a second linkage member connected between the first linkage member and the pivot plate to cause rotation of the first linkage member in direct relation to movement of the pivot plate.

12. The apparatus for supporting a cutting blade of claim 11 wherein the second linkage member and is pivotally connected at a fourth point to the first linkage member and is pivotally connected at a fifth point to the pivot plate.

13. The apparatus for supporting a cutting blade of claim 12 wherein the second linkage member is adjustable to vary the distance between the fourth and fifth points.

14. The apparatus for supporting a cutting blade of claim 6 wherein said rocker arm includes a bracket for releasable locking receipt of the bar therein.

15. The apparatus for supporting a cutting blade of claim 6 wherein the bar includes adjustment means for releasably lockingly varying the position of the bar relative to said rocker arm.

16. The apparatus for supporting a cutting blade of claim 15 wherein the adjustment means includes a plurality of spacers slidably received on said bar for positionment on either side of a bracket connected to said rocker arm.

17. The apparatus for supporting a cutting blade of claim 15 wherein the adjustment means includes a remotely operational cable means connected at one end to the bar and connected at its other end to a sixth point remote from said rocker arm, wherein said cable may be actuated at its remote other end to effect movement of the bar and thereby directly proportional and corresponding vertical movement of said deck.

18. The apparatus for supporting a cutting blade of claim 17 wherein bar includes slack means to permit upward vertical movement of said deck without corresponding movement of said cable means.

* * * * *